(12) United States Patent
Bellota

(10) Patent No.: US 8,887,874 B2
(45) Date of Patent: Nov. 18, 2014

(54) DOCK LOCKING DEVICE FOR A TRANSPORT FREIGHT VEHICLE AND EQUIPMENT INCLUDING SAME

(75) Inventor: Ignace Bellota, Laroin (FR)

(73) Assignee: A.S.A Fermetures, Lescar (FR)

( * ) Notice: Subject to any disclaimer, the term of this patent is extended or adjusted under 35 U.S.C. 154(b) by 513 days.

(21) Appl. No.: 13/041,014

(22) Filed: Mar. 4, 2011

(65) Prior Publication Data

US 2011/0220439 A1 Sep. 15, 2011

Related U.S. Application Data

(60) Provisional application No. 61/320,931, filed on Apr. 5, 2010.

(30) Foreign Application Priority Data

Mar. 6, 2010 (FR) ...................................... 10 00914
Nov. 17, 2010 (FR) ...................................... 10 04465

(51) Int. Cl.
*B60T 3/00* (2006.01)
*B65G 69/00* (2006.01)

(52) U.S. Cl.
CPC ................................... *B65G 69/005* (2013.01)
USPC ............................................. 188/32; 188/36

(58) Field of Classification Search
USPC .................. 188/4 R, 5, 32, 36; 414/401, 584; 410/30; 280/6.151
See application file for complete search history.

(56) References Cited

U.S. PATENT DOCUMENTS 3,221,907 A * 12/1965 O'Sullivan .................... 414/787
4,207,019 A   6/1980 Cone (Continued)

FOREIGN PATENT DOCUMENTS

DE  44 27 406 C1  10/1995
EP     0537075  * 10/1992  ............. B65G 67/02

(Continued)

OTHER PUBLICATIONS

Machine Translation of EP 0537075 (no date).*

(Continued)

*Primary Examiner* — Bradley King
*Assistant Examiner* — Nicholas J Lane
(74) *Attorney, Agent, or Firm* — Oblon, Spivak, McClelland, Maier & Neustadt, L.L.P.

(57) ABSTRACT

The device for chocking a goods transportation vehicle at a dock comprises a horizontal support (1) designed to be anchored on the ground fronting a loading dock, a horizontal platen (2) mounted slidingly on a horizontal support (1), a rear chock (3), designed to constitute a stop for the last rear wheel train of the vehicle to be chocked at the dock, the said rear chock being integral with the said platen, a front movable thrust-action chock (4), carried by the horizontal platen (2) at a distance from the rear chock (3), the said platen (2) being actuated slidingly along the support (1) between an anterior rest position and a posterior position of chocking the transportation vehicle at the dock by a motor assembly (5), which is also capable of immobilizing the platen both in anterior rest position and in the position of chocking at the dock and maintaining it in these positions, and the front thrust-action chock being able to occupy a release position, in which it is spaced apart from the trajectory of the rear wheels of the vehicle, and an active position, in which, on the one hand, it is disposed facing one of the surfaces of revolution of one of the rear wheels of the vehicle and, on the other hand, by displacement of the platen (2) toward its chocking position, it can act in thrust manner on this surface of revolution.

11 Claims, 15 Drawing Sheets

(56) References Cited

U.S. PATENT DOCUMENTS

Figure 1:
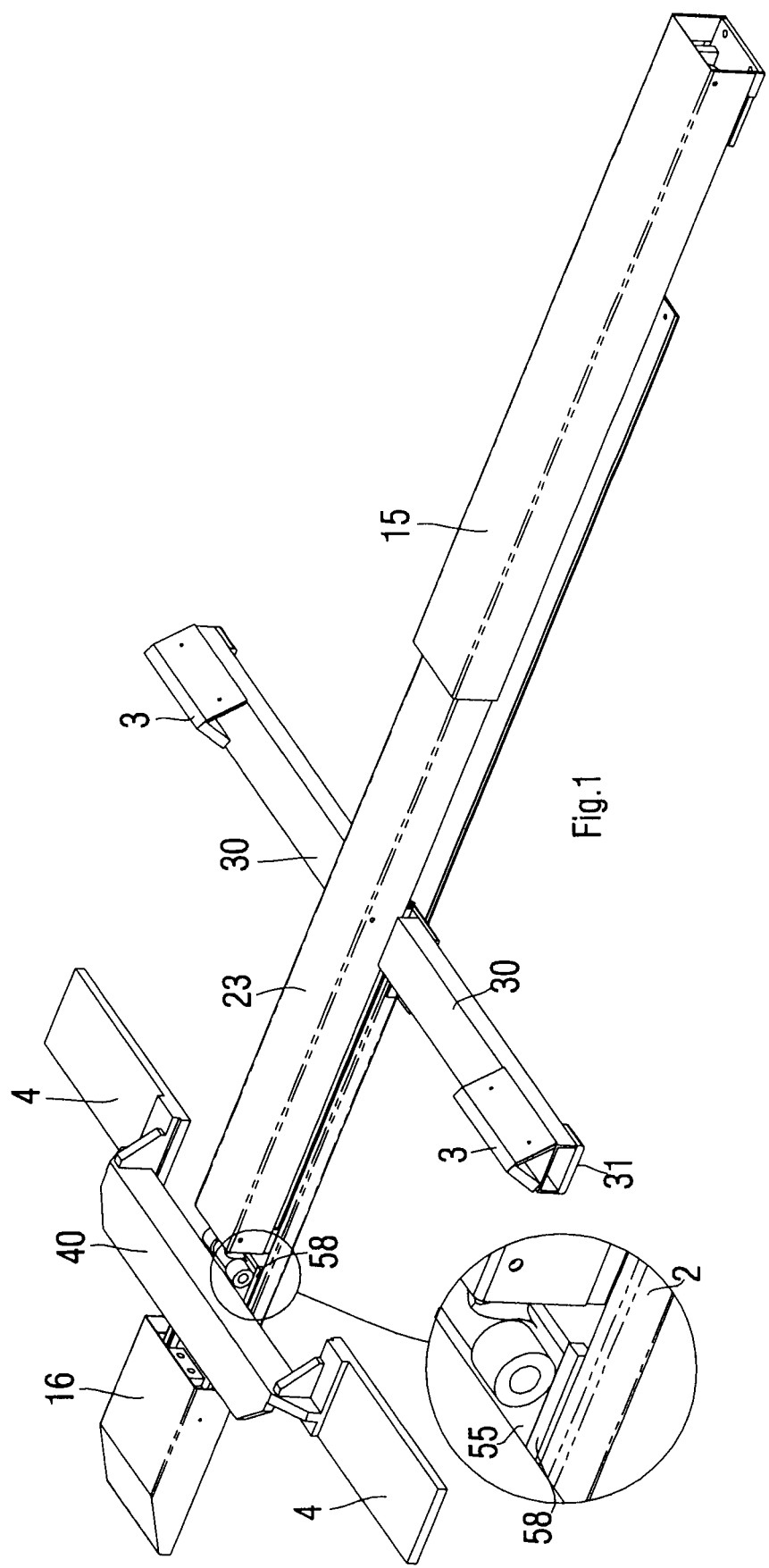

| | | | |
|---|---|---|---|
| 5,096,021 A * | 3/1992 | Tart | 188/32 |
| 5,531,557 A * | 7/1996 | Springer | 414/401 |
| 5,553,987 A * | 9/1996 | Ellis | 414/401 |
| 5,582,498 A * | 12/1996 | Springer et al. | 414/401 |
| 5,896,957 A * | 4/1999 | Berends et al. | 188/32 |
| 6,371,253 B1 * | 4/2002 | Berends et al. | 188/32 |
| 6,589,003 B2 * | 7/2003 | Berends | 414/401 |
| 6,773,221 B2 * | 8/2004 | Belongia et al. | 414/401 |
| 2002/0136620 A1 * | 9/2002 | Berends | 414/401 |
| 2003/0007850 A1 * | 1/2003 | Belongia et al. | 414/401 |
| 2005/0133315 A1 * | 6/2005 | Hoofard | 188/5 |
| 2012/0282069 A1 * | 11/2012 | Ballester | 414/401 |

FOREIGN PATENT DOCUMENTS

| | | | |
|---|---|---|---|
| EP | 0 537 075 A1 | 4/1993 | |
| EP | 1 095 880 A1 | 5/2001 | |
| EP | 1 764 275 A1 | 3/2007 | |
| FR | 2750123 * | 6/1996 | B65G 69/00 |
| FR | 2 909 364 A1 | 6/2008 | |
| FR | 2 935 965 A1 | 3/2010 | |
| WO | WO 95/18029 A1 | 7/1995 | |
| WO | WO 01/43526 A2 | 6/2001 | |
| WO | WO 01/43526 A3 | 6/2001 | |

OTHER PUBLICATIONS

Machine Translation of FR 2750123 (no date).*
Machine Translation of FR 2909364 (no date).*
French Preliminary Search Report and Written Opinion issued on Nov. 18, 2010 in corresponding French Application No. 10 00914 filed on Mar. 6, 2010 (with an English Translation of Category).
French Preliminary Search Report and Written Opinion issued on Apr. 1, 2011 in corresponding French Application No. 10 04465 filed on Nov. 17, 2010 (with an English Translation of Category).

* cited by examiner

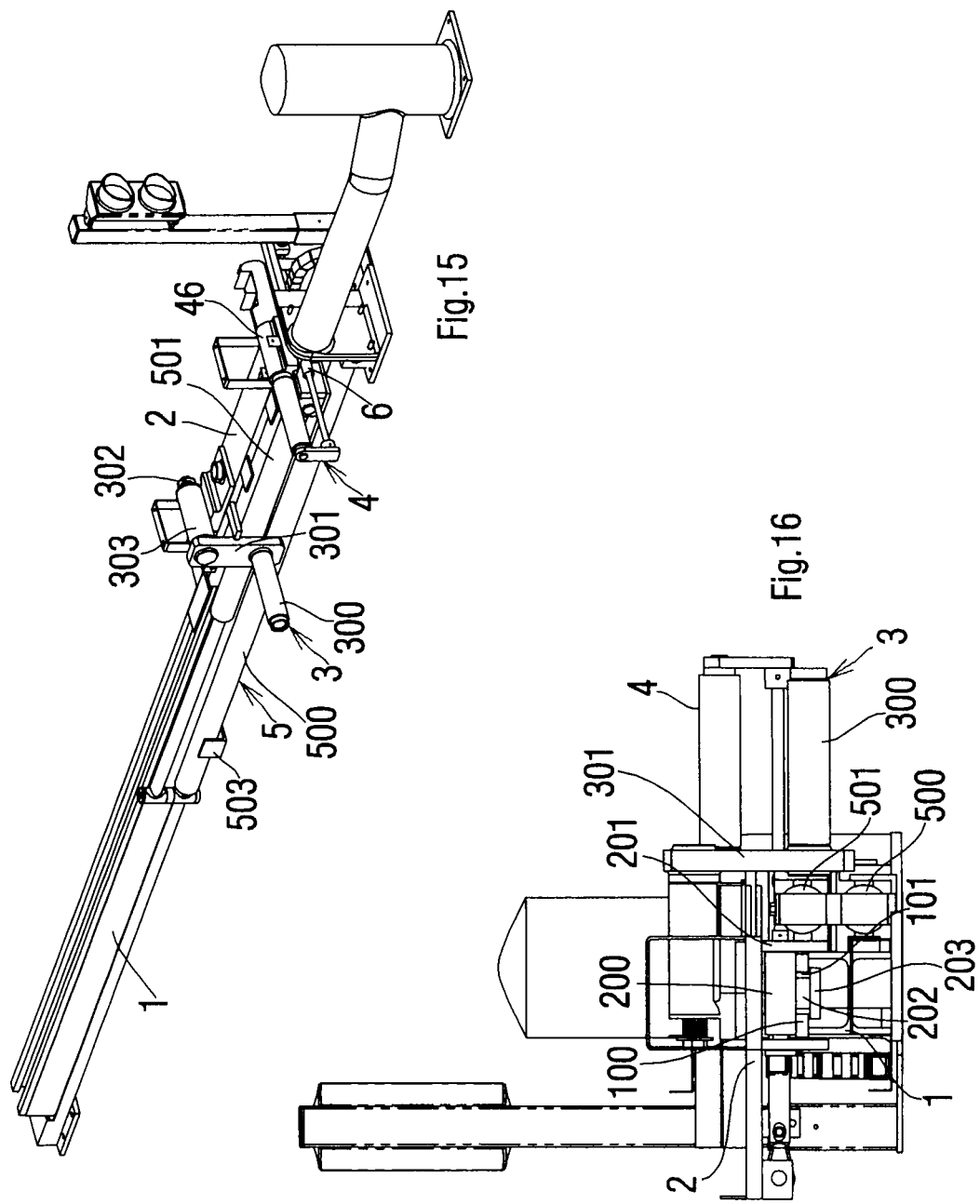

DOCK LOCKING DEVICE FOR A TRANSPORT FREIGHT VEHICLE AND EQUIPMENT INCLUDING SAME

TECHNICAL FIELD

The present invention falls within the field of equipment used to immobilize a transportation vehicle securely against a goods transfer dock, and it relates more particularly to a device with chocks capable of being placed against one of the rear wheel trains of the vehicle to prevent any movement thereof during the time that it is being loaded and unloaded.

PRIOR ART

Devices for chocking transportation vehicles at a dock are known from the prior art. Such devices are known in particular from patent applications EP 537075, EP 1095880, FR 2652340, U.S. Pat. No. 4,207,019, DE 4401653, WO 95/18029, WO 01/43526, EP 1095880, FR 2909364, U.S. Pat. No. 4,207,019, FR 2935965.

DESCRIPTION OF THE INVENTION

In the present description, a wheel train is a set of wheels mounted on the same axle. The last rear wheel train is the wheel train closest to the rear of the vehicle and the first rear wheel train is the rear wheel train closest to the front of the vehicle. The intermediate wheel train is the wheel train situated between the first and the last rear wheel trains.

TECHNICAL PROBLEM

Typically with a view to securing a goods transportation vehicle against a transshipment dock and maintaining it there during the transshipment time, the vehicle is initially backed up in a first phase in order to place at least one of the wheel trains thereof in the zone of action of a chocking device provided with thrust-action chocks. Once the adequate position has been reached, the driver stops his vehicle, turns off the engine and sets the parking brake in an inactive position. In a second phase, the chocking device is activated under the guidance and control of an operator in such a way that, by thrust action of chocks on one of the wheel trains, the rear of the vehicle is brought up against the transshipment dock and is securely maintained there throughout the time of loading and unloading of goods.

The first phase of backing up the vehicle is usually carried out blind, since it is impossible for the driver to see obstacles and persons situated on the trajectory of the rear of his vehicle. In this maneuver he may be assisted by a person stationed on the transshipment dock, but when the distance becomes shorter than five meters the person disappears from the field of vision of the rear mirrors. To be seen by the driver, this person must position himself once again in the field of vision, thus forcing him to be exposed physically to a risk of being crushed between the dock and the rear of the vehicle. Thus the need is apparent to make the vehicle stop when the distance between the rear thereof and the dock becomes close to a pre-established value, which must be greater than fifty centimeters. To achieve such an objective, the loading dock installations are usually equipped with means capable of detecting the position of the rear of the vehicle and of acting on a light signal for the use of the driver. In this way the driver is prompted by an appropriate light signal to have to stop his vehicle. The disadvantage of this arrangement is that the light signal may become difficult to see under certain daylight conditions. In addition, the driver may prove to be inattentive or particularly reckless and may disregard the signal system. These prior art arrangements are therefore unable to overcome the human factor and they lack reliability.

The prior art devices are designed to be capable of coming up against the wheels of the first rear wheel train and, by thrusting them, of driving the vehicle against the loading dock and maintaining it in this position. The merit of such devices lies in the fact that no means for detecting the position of the first wheel train is necessary for their operation, the stroke of the thrust-action chock being sufficient to act in thrust manner against this train regardless of its position relative to the dock. However, these devices are mainly designed to chock the wheels of the first rear wheel train, whereas access to this first train may be made difficult by the strut assemblies with which certain vehicles are equipped immediately in front of this first train. In fact, it has been observed that the distance between these strut assemblies and the ground is too short to permit complete deployment of immobilizing chocks, so that these chocks collide with the lower wall of the strut assembly during this deployment movement, and their advance is blocked thereby. This therefore makes it impossible to chock the vehicle and results in damage to the strut assembly.

The inventor has attempted to overcome this disadvantage by acting no longer on the first wheel train but on the last train or on the intermediate train. However, under these conditions it is necessary that the deployment of the chocks take place between two wheel trains, or in other words between the first wheel train and the train immediately to its rear. Although it is easy for the prior art systems to act on the first train without knowing its position beforehand, this is not the case when the thrust must be applied to the last wheel train or to the intermediate wheel train and, for this reason, the deployment of the chock must take place between two successive wheel trains.

TECHNICAL SOLUTION

The objective of the present invention is to provide solutions to the aforesaid technical problems by proposing a device capable of forming a physical barrier of such nature as to constitute a stop to the backing up of the vehicle toward the dock during the preparatory backing-up phase and in this way to preserve a sufficient safety distance between the rear of the vehicle and the dock at the end of this preparatory phase, so as to prevent the risks of accident by crushing.

Another objective of the present invention is to propose a device capable of acting on the wheels of the last wheel train of the vehicle or on the wheels of the intermediate train if such is present on the vehicle.

To this end the device according to the invention for chocking a goods transportation vehicle at a dock is characterized substantially in that it comprises a horizontal support designed to be anchored on the ground fronting a loading dock, a horizontal platen mounted slidingly on a horizontal support, a rear chock, designed to constitute a stop for the last rear wheel train of the vehicle to be chocked at the dock, the said rear chock being integral with the said platen, a front movable thrust-action chock, carried by the horizontal platen at a distance from the rear chock, the said platen being actuated slidingly along the support between an anterior rest position and a posterior position of chocking the transportation vehicle at the dock by a motor assembly, which is also capable of immobilizing the platen both in anterior rest position and in the position of chocking at the dock and maintaining it in these positions, the front thrust-action chock being able to occupy a release position, in which it is spaced apart from the trajectory of the rear wheels of the vehicle, and an active position, in which, on the one hand, it is disposed facing one of the surfaces of revolution of one of the rear wheels of the vehicle and, on the other hand, by displacement of the platen toward its chocking position, it can act in thrust manner on this surface of revolution.

In this way the rear chock constitutes an obstacle to the advance of the vehicle toward the dock. Thus this vehicle is systematically stopped at a distance from the dock in order to preserve a safety distance in front of the dock. Subsequently the vehicle will be brought up to the dock not with the assistance of its own motor means but with the assistance of the motor assembly of the device, monitored and controlled by a docking supervisor.

According to another characteristic, the device according to the invention, designed to secure vehicles possessing at least one rear wheel train at a dock, is characterized in that the distance between the rear chock and the front chock is adapted to the diameters of the wheels of the last rear train of transportation vehicles and in that this distance is such that, when the last rear wheel train is braced against the rear or each rear chock, the front or each front chock, in rest position, is disposed facing an unoccupied zone situated immediately in front of the tread surface of the tire of at least one of the wheels of the last rear train.

According to another characteristic, the device according to the invention, designed to secure vehicles possessing at least two rear wheel trains at a dock, is characterized in that the distance between the rear chock and the front chock is adapted to the diameters of the wheels of the rear trains of transportation vehicles and in that this distance is such that, when the last rear wheel train is braced against the rear or each rear chock, the front or each front chock, in rest position, is disposed behind the first rear wheel train and spaced apart from the last rear wheel train in such a way that it can be freely actuated toward its active position and then, during the movement of the platen toward the chocking position, can act directly in thrust manner on the wheel trains immediately behind, which wheel train may be the last wheel train of the vehicle or the intermediate or one of the intermediate trains.

Since the diameters of the wheels of transportation vehicles are generally between 800 and 1100 mm, and the distance between two successive rear axles is generally between 1300 and 1400 mm, the distance between the rear chock and the front chock in release position will be on the order of 1300 mm or 2400 to 2700 mm, depending on whether the device is configured for the front chock or chocks acting on the last rear wheel train or else on the intermediate wheel train.

In this way the rear chock constitutes both an obstacle to the advance of the truck toward the dock and a reference for the position of the last rear wheel train. Since the value of the distance between this rear chock and the front chock is chosen as a function of the different diameters of the vehicle wheels, it will be possible for the front chock to be deployed systematically between two wheel trains so that ultimately it can act in thrust manner on the train situated immediately behind.

According to a first arrangement of the invention, the front or each front chock acts on the tread surface of the tire of the corresponding wheel of the vehicle, but according to another characteristic the device according to the invention, designed to secure vehicles possessing at least one rear wheel train at a dock, is characterized in particular in that the distance between the rear chock and the front chock is adapted to the diameters of the wheels of the last rear train and that this distance is such that, when the last rear wheel train is braced against the rear or each rear chock, the front or each front chock, in rest position, is disposed facing the wheel rim of one of the wheels and in active position is disposed in the volume of the said wheel rim to act in thrust manner on the concave cylindrical surface thereof during the movement of the platen from its anterior position toward its chocking position. According to this arrangement, the distance between the front and rear chocks will be between 20 and 40 cm.

It is therefore understood that the arrangements described in the foregoing solve not only the problems of crushing of persons against the dock but also the problems of damage to the strut assemblies provided on the vehicles in front of the first rear wheel train.

According to another arrangement of the invention, each rear chock and each front chock are disposed laterally relative to the platen, at least when they are in active position. By virtue of this arrangement, the support, the platen and the motor assembly are spaced laterally apart from the trajectory of the wheels of the transportation vehicle and cannot be damaged, especially by the weight thereof.

According to another arrangement of the invention, each front chock is driven between the release position and the active position and vice versa by a motor means.

According to a practical mode of implementation of a first embodiment of the device, each front and rear chock is carried by a horizontal arm integral with the platen and extending laterally relative thereto. By virtue of this arrangement, the support, the platen and the motor assembly are disposed at a distance from the front and rear chocks and are offset laterally therefrom and from the trajectory of the wheels of the vehicles.

Advantageously, according to another arrangement of the first embodiment, the device according to the invention is provided with two rear chocks and two front chocks, each carried by a lateral arm, the platen, the support and the motor assembly occupying a central position relative to the rear and front chocks. This arrangement permits balancing of the forces exerted by the vehicle wheels on the device and on the motor assembly with which it is provided.

According to another characteristic of the invention relating to the first embodiment of the device, the lateral arms associated with the front chocks are connected to one another. Such an arrangement leads to simplification of the device and ensures perfect synchronization of the movements of the front chocks in particular between the release position and the active position.

According to another arrangement of the first embodiment of the invention, the front or each front chock is mounted in articulated manner relative to the platen around a horizontal geometric axis (AA') perpendicular to the direction of displacement of the said platen along the support. This arrangement is intended to simplify implementation of the chocking device even more.

According to a practical form of implementation of the first embodiment of the invention, the one-piece member forming the two arms of the front chocks is provided with a central crosspiece engaged in articulated manner on a shaft mounted via its ends on two lateral vertical cheeks of the platen.

In addition, according to another arrangement of the first embodiment of the invention, the release position and the active position of each front chock are manifested by stops.

According to another arrangement of the first embodiment of the invention, the front or each front chock is actuated between its release position and its active position by the motor assembly for actuation of the platen, and the said motor assembly is linked kinematically to the arms of the front chocks by a movement transmission capable of impressing on these chocks a tilting motion around axis AA' between its release position and its active position and vice versa. Such an arrangement leads to simplification of the device according to the invention.

According to another characteristic of the first embodiment of the invention, the aforesaid movement transmission comprises:

a slide guided in translation on the movable platen, this slide being integral with the motor assembly, at least one rack installed in fixed relationship on the slide and extending in a direction parallel to the direction of displacement of the platen on the support, and at least one toothed pinion in engagement relationship with the rack, the said pinion being rigidly fixed to one of the cheeks of the central crosspiece, in a manner centered relative to the pivoting axis AA'.

The merit of such an arrangement lies in the fact that the motor assembly and the transmission are not displaced upward during the pivoting of the front chocks and remain close to the ground and spaced apart from means with which the vehicle may be provided laterally of the wheels, such as excessively lowered suspension elements or other means of certain prior art systems, such as the transmissions and means for tracking the movement of the chocks, which hinder the deployment of the chocks by forming obstacles to their movement.

BRIEF DESCRIPTION OF THE FIGURES AND DRAWINGS

Figure 2:
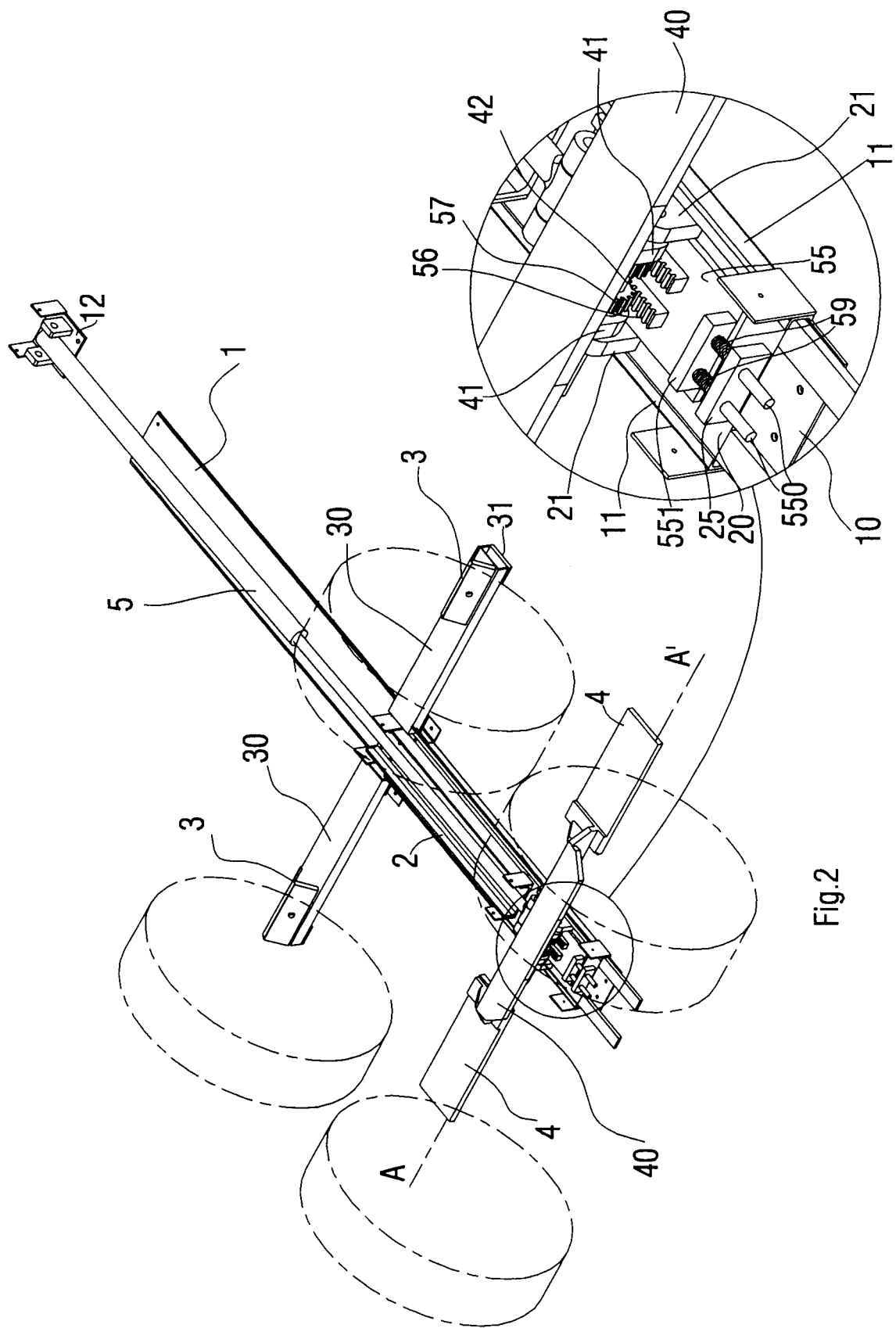
Figure 3:
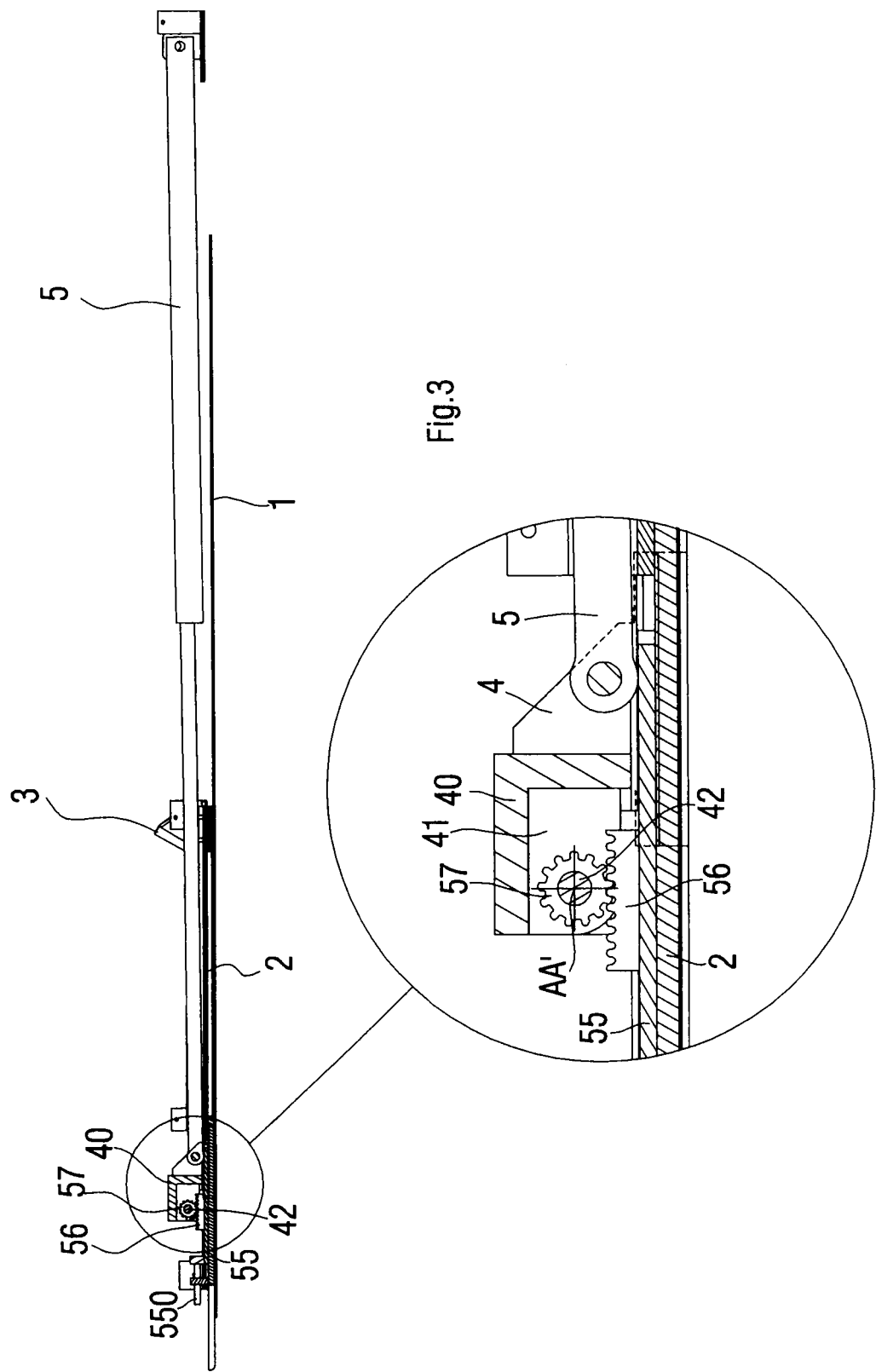
Figure 4:
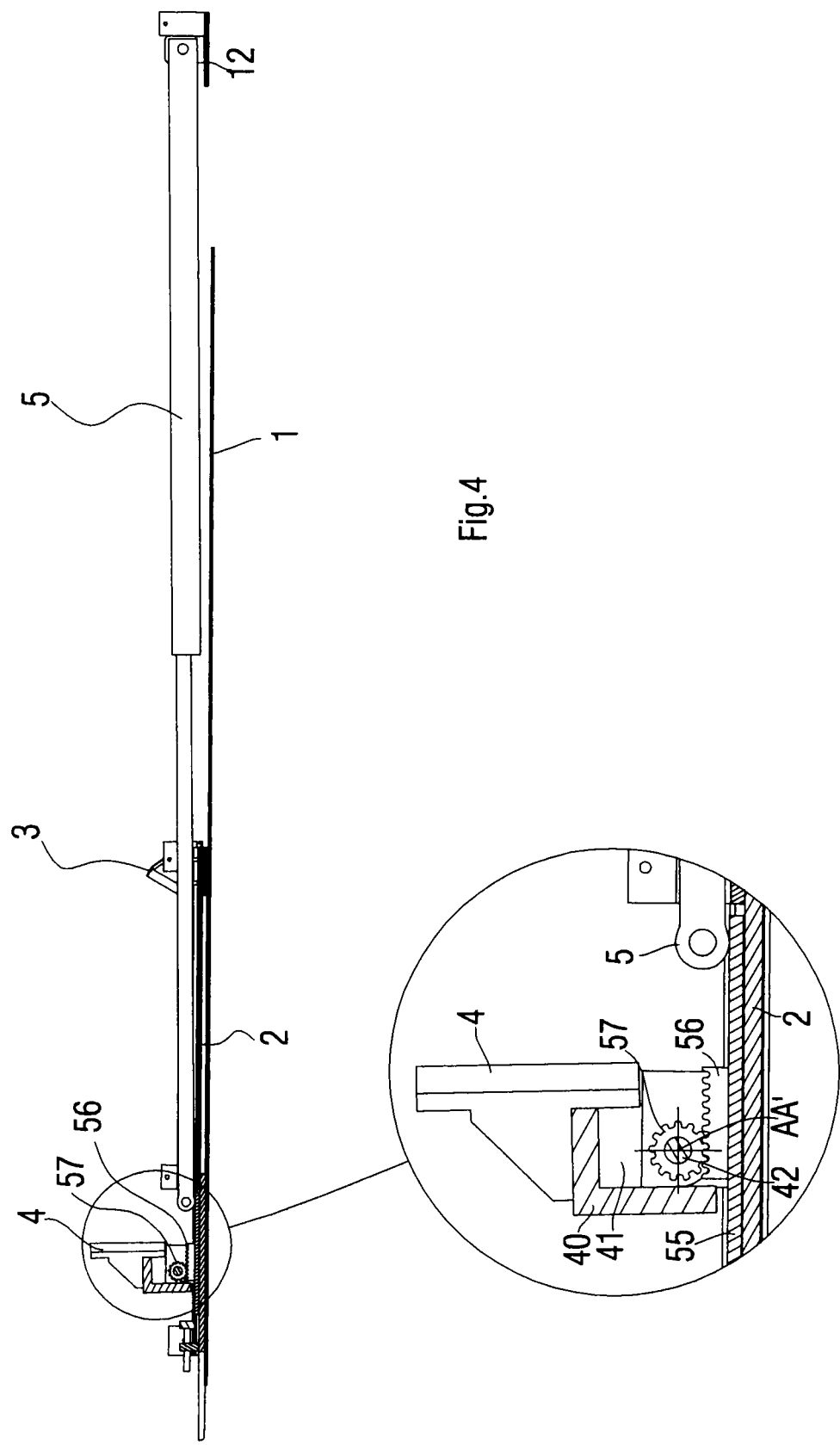
Figure 8:
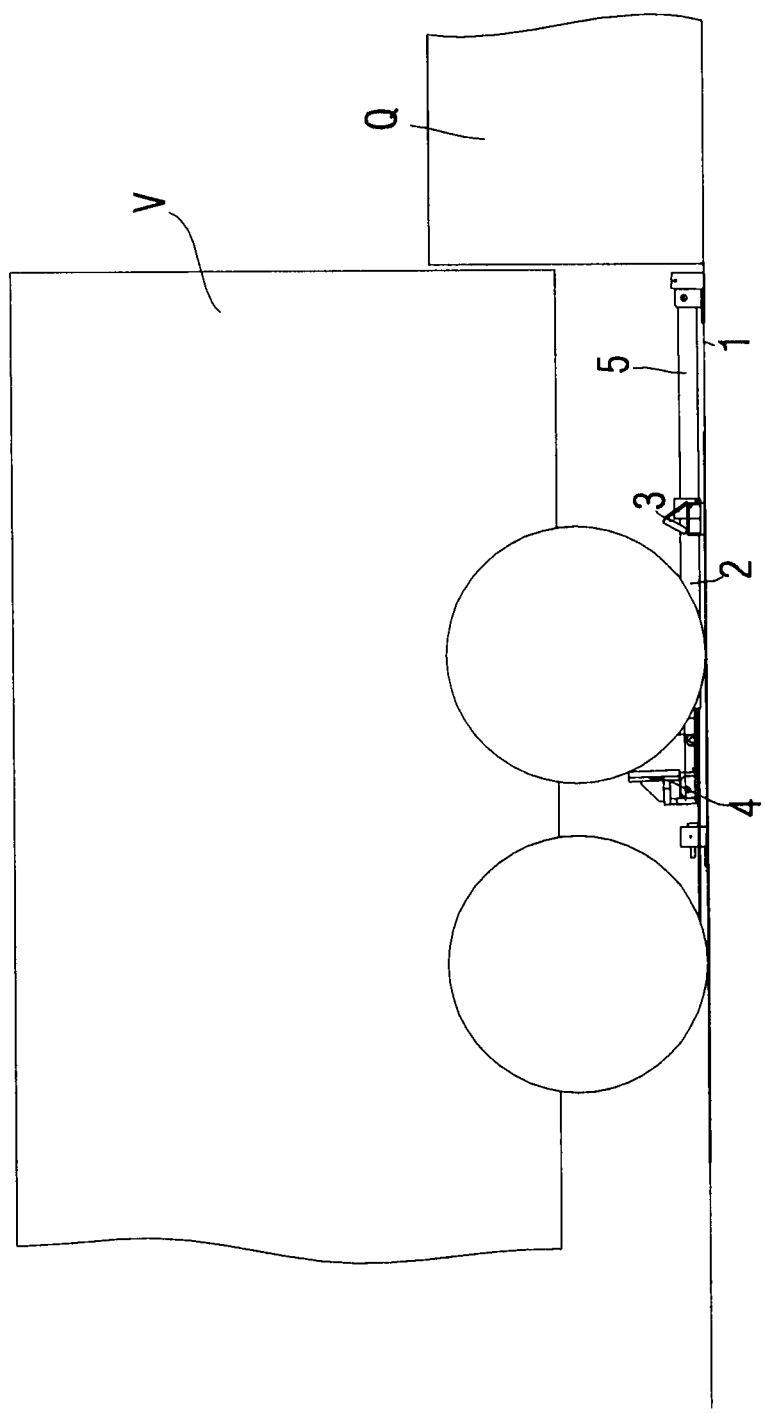
Figure 9:
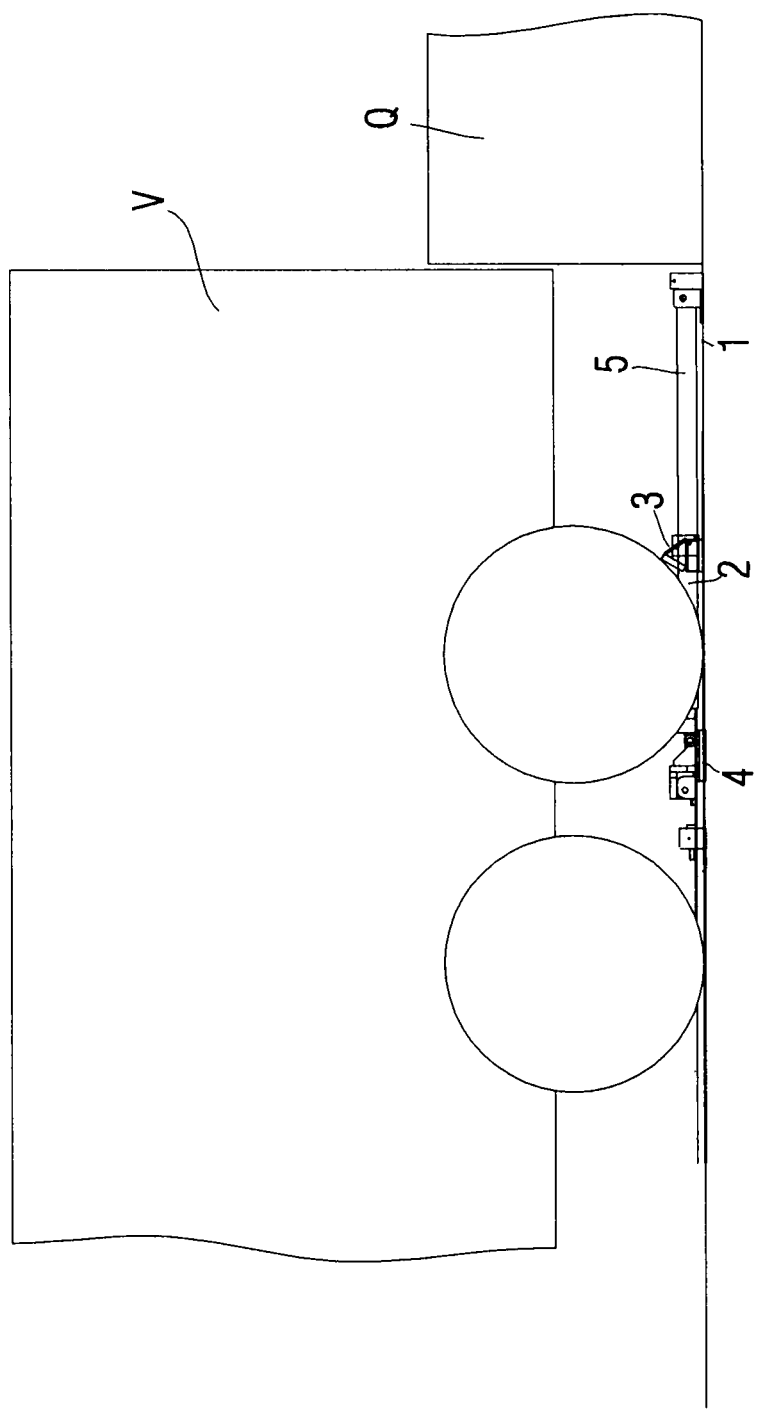
Figure 10:
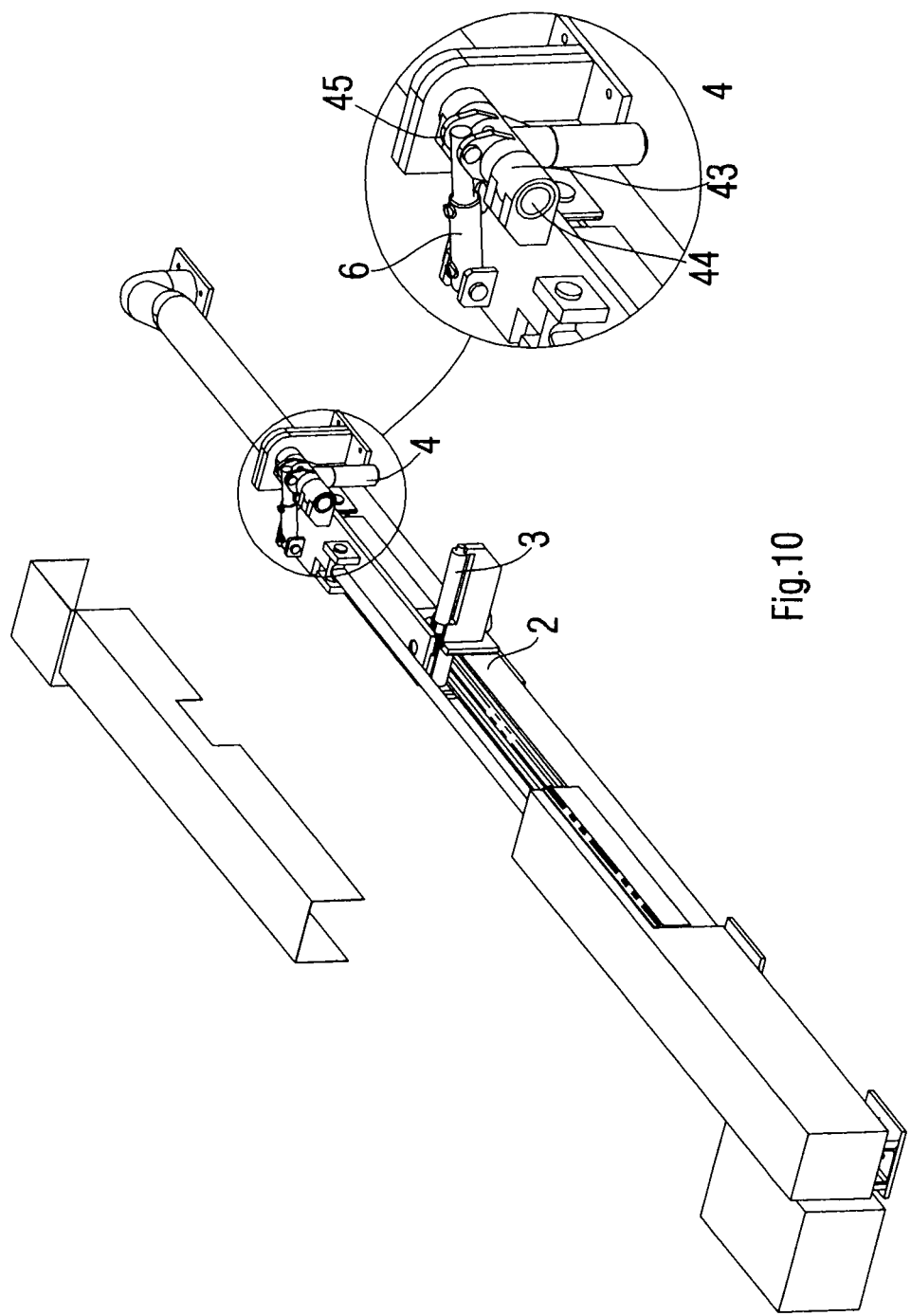
Figure 11:
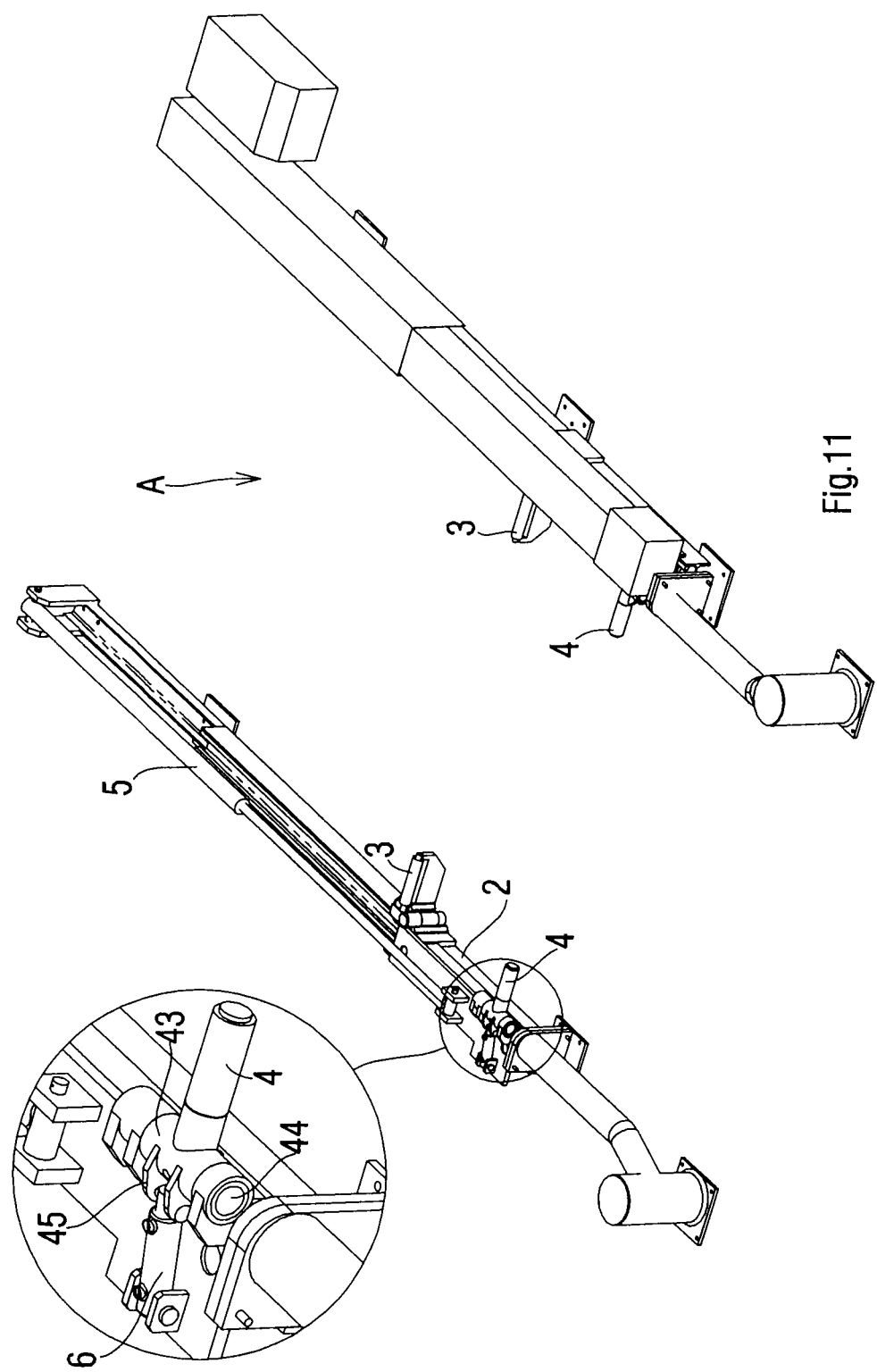
Figure 12:
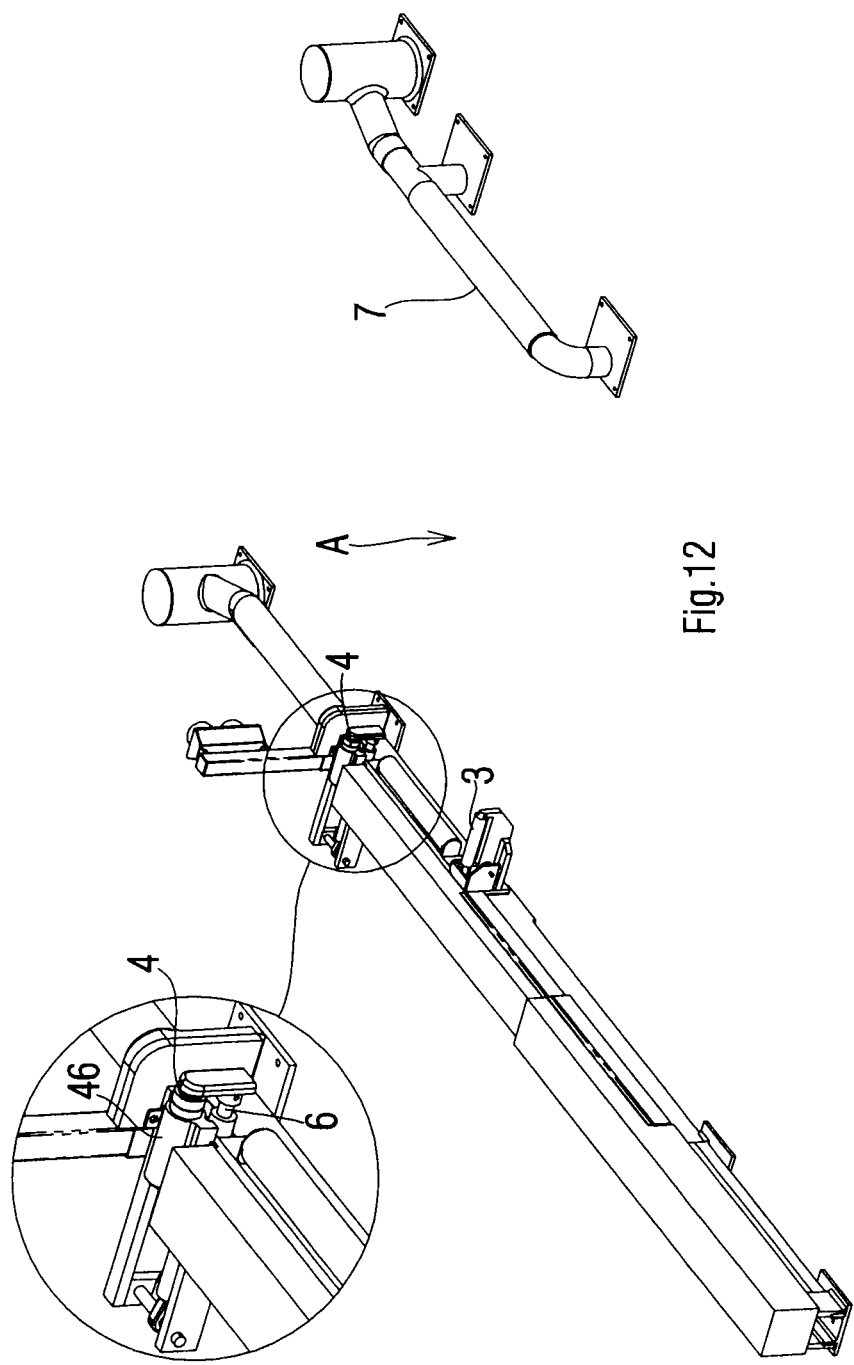
Figure 13:
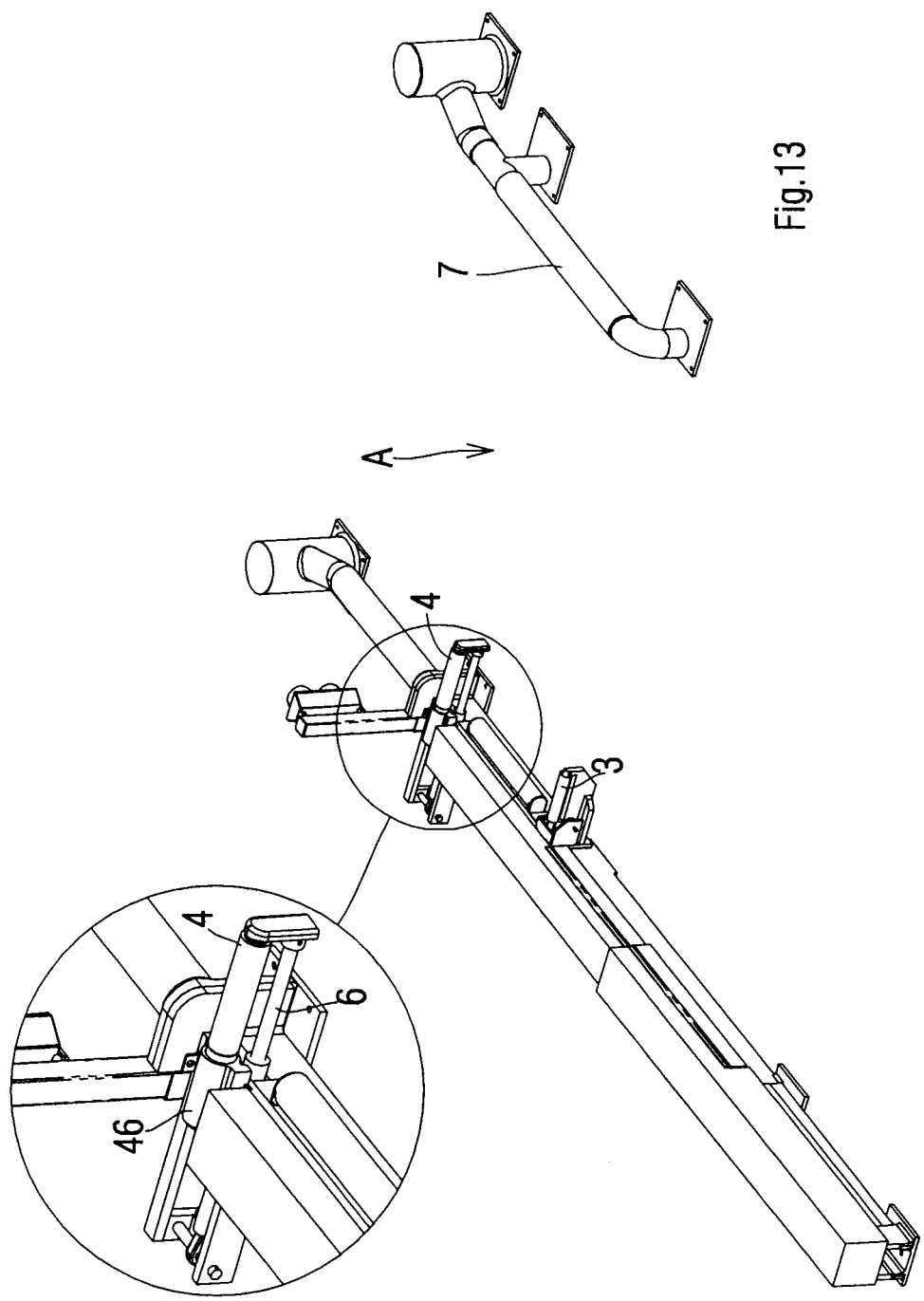
Figure 14:
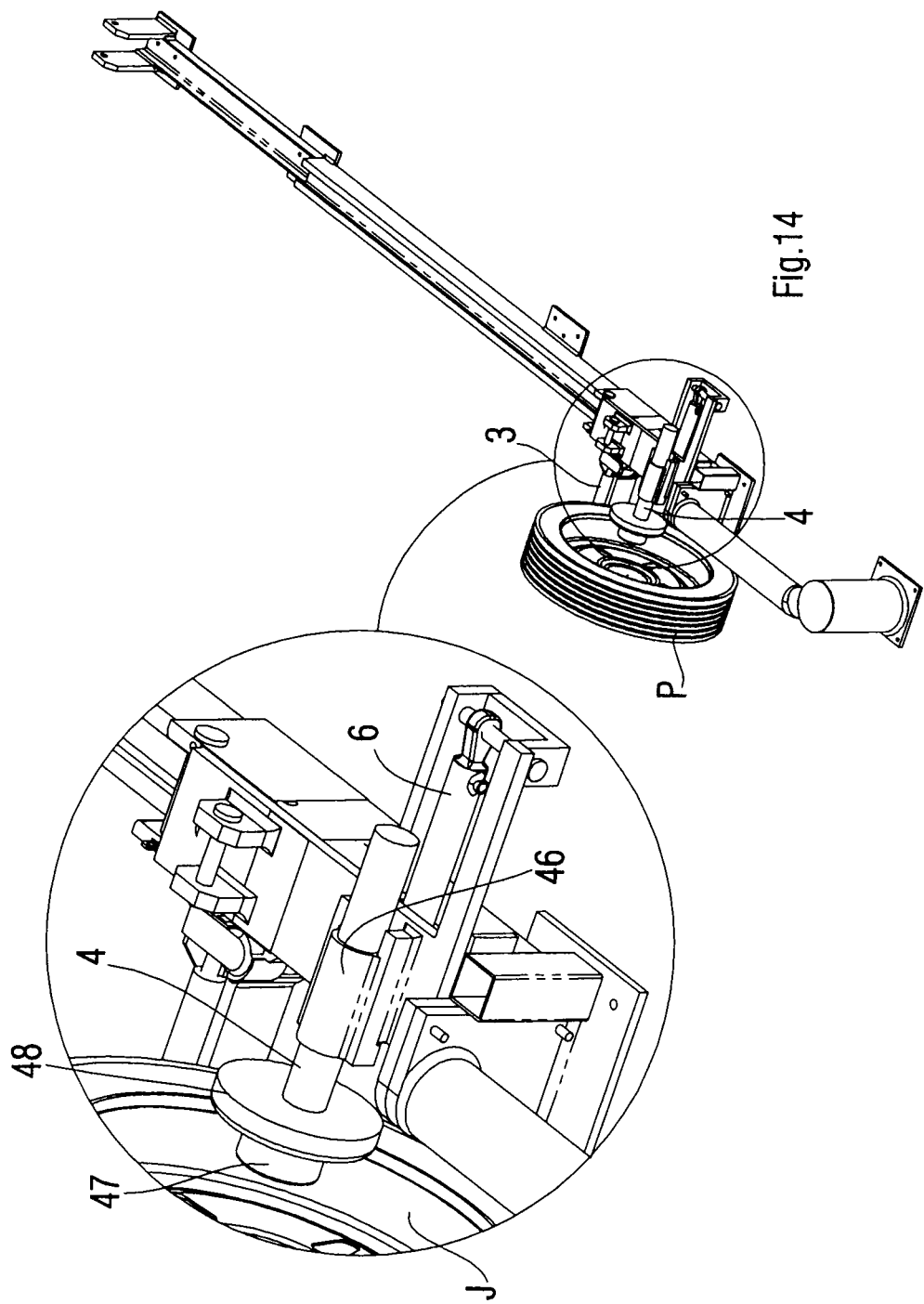

Other advantages and characteristics of the invention will become apparent upon reading the description of a preferred embodiment, given by way of non-limitative example, with reference to the attached drawings, wherein:

FIG. 1 is a perspective view of a device according to the invention, in rest position, FIG. 2 shows a device according to the invention in perspective, in rest position, without the protective elements, the wheels of the vehicle being shown in this figure as light dot-dash lines, FIG. 3 is a view of the device in longitudinal section, the front chocks being in release position, FIG. 4 is a view of the device in longitudinal section, the front chocks being in active position, FIGS. 5 to 9 illustrate the mode of operation of the device according to the invention, FIG. 10 shows a device according to a second embodiment in perspective, the front chock being in inactive position, FIG. 11 shows the device according to the second embodiment in perspective, the front chock being in active position, FIG. 12 shows a device according to a third embodiment in perspective, the front chock being in inactive position, FIG. 13 shows the device according to the third embodiment in perspective, the front chock being in active position, FIG. 14 shows a fourth embodiment of the device according to the invention in perspective, FIG. 15 shows a fifth embodiment of the device according to the invention in perspective, the protective caps not being represented, FIG. 16 is a profile view of the device according to FIG. 15.

BEST WAY OF WORKING THE INVENTION

As illustrated, the device according to the invention for chocking a goods transportation vehicle at a dock comprises a support 1 designed to be fixed on the ground, a movable platen 2 mounted slidingly on support 1 between an anterior rest position and a posterior chocking position and vice versa, at least one rear chock 3 carried in fixed relationship by platen 2, at least one front chock 4 carried by platen 2, this front chock 4 being movable between a release position and an active position, according to which it is able to act on at least one of the rear wheels of the vehicle by movement of the platen, especially toward its chocking position. These two extreme positions of front chock 4 may be manifested by stops. The movability of the chock between the release position and the active position is preferably assured by control, under the effect of the action of a motor means.

The device according to the invention additionally comprises a motor assembly 5 integral with support 1 and capable of displacing platen 2 between the anterior rest position and the posterior chocking position and vice versa and of maintaining the said platen 2 securely either in rest position or in chocking position when required, in order that, in these position, the action of the vehicle wheels on the chock or chocks 3, 4 carried by this platen is inoperative and unable to displace the platen along the support.

In this way, when the vehicle is being backed up toward the dock, it will be stopped in its progress by the rear chock and will no longer be able to continue its travel, platen 2 being disposed and maintained in anterior rest position in this case. Thus, at the rear of the vehicle, it will be possible to preserve a sufficient safety distance at least equal to fifty centimeters between the rearmost part of the vehicle and the dock. The position of the device relative to the dock will take into account the fact that sometimes the vehicle drivers, before any backing movement toward the dock, lower the rear tailgate to horizontal position to the detriment of all safety rules. The immobilization of platen 2 in anterior position and therefore of rear chock 3 therefore reduces the risk of fatal accidents.

After the vehicle has been immobilized at a distance from the dock and the vehicle engine has been turned off, motor assembly 5 will be activated to bring the vehicle up to the dock, but this backing operation will be carried out under the monitoring and control of a supervisor for this task and not under the control of the vehicle driver. During this backing movement, therefore, the supervisor will be able at all times to watch over especially the zone between the dock and the vehicle and to stop the advance of the vehicle toward the dock in the case of danger.

FIGS. 1 to 9 show a device according to a first embodiment.

As can be seen, front or each front chock 4 is carried in articulated manner by platen 2, and this front chock 4 is movable between a release position, in which it is horizontal and braced on the ground, and an active position, in which it is raised relative to the horizontal and occupies substantially a vertical position.

Chocks 3 and 4, whose width corresponds to that of the vehicle wheels, are each carried at the end of an arm 30, 40 integral with platen 2 and extending laterally relative thereto. Advantageously, arm 30 is equipped with a shoe 31 for sliding on the ground. In the preferred embodiment, the device is equipped with two rear chocks 3, right and left, and with two front chocks 4, right and left, each again carried respectively by a lateral arm 30, 40. By virtue of this arrangement, the device acts simultaneously on the right and left wheels of the last wheel train or of the intermediate train of the transportation vehicle.

Support 1 comprises a substantially rectangular, horizontal base plate 10, braced and anchored on the ground, flanked in its anterior part by two opposite lateral flanges 11, forming a guide rail for platen 2, which is braced slidingly on base plate 10 between lateral flanges 11.

At a distance from base plate 10, and behind it, support 1 comprises a sole plate 12 for anchoring to the ground, motor assembly 5 being integral therewith. This anchoring sole plate 12 comprises two lateral, upwardly projecting lugs, to which there is fixed a covering and protection element 15 of motor means 5. This elongated covering and protection element has a downwardly open channel cross section. In the anterior part, support 1 receives a second covering and protection element 16, which just as the first has a downwardly open channel cross section.

Platen 2 is constituted substantially by a channel cross section profiled member, provided at the anterior part with a guide 20 in the form of a rectangular plate. This guide is engaged by its lateral rims in the two guide rails 11.

This platen 2 is provided with two upwardly projecting lugs, to which there is fixed an elongated covering and protection element 23 having a downwardly open channel cross section. This protection element covers the major part of platen 2 and is forced to penetrate into the volume defined by covering and protection element 15. This arrangement makes it possible to ensure continuity in covering and protection.

In its posterior part, platen 2 receives the two lateral arms 30 in fixed relationship, these being advantageously constituted by a tubular rectangular cross section profiled member.

Each rear chock 3 is fixed on the plane upper face of the corresponding arm 30 and forms a projection above it.

In the preferred embodiment, each chock 3 is formed—without that being limitative—from two rectangular plates formed as angle pieces and fixed by welding to one another and to the corresponding arm 30.

In its anterior part, platen 2 receives the two lateral arms 40, which carry front chocks 4. Advantageously, the two arms 40 are connected to one another and form a single piece, which is provided with a central crosspiece 41, via which it is engaged in articulated manner on a shaft 42 mounted via its ends on two lateral, vertical cheeks 21 of platen 2. As is evident, this shaft 42 manifests a horizontal geometric axis of articulation AA', around which front chocks 4 are made to pivot when they are mobilized from their rest position toward their active position and vice versa. This geometric axis AA' extends perpendicular to the direction of movement of platen 2 on the support.

It should be noted that front chocks 4 are disposed in their entirety on one side of a geometric plane containing axis of articulation AA', and in the present embodiment behind it. In this way, during their pivoting movement around axis AA' from the release position to the active position, which movement takes place from the rear to the front, front chocks 4 will detach from the ground without scraping thereon. In addition, in active position, these chocks 4 are always situated on one side of the aforesaid plane, and in the present embodiment behind it. In this way, their weight causes a tilting moment that urges them toward their release position.

Preferably, motor assembly 5 also actuates the front or each front chock 4. To this end, this motor assembly 5 is kinematically linked to chocks 4 and more precisely to arms 40 by a movement transmission capable of impressing on each chock 4 a tilting movement between its release position and its active position or vice versa, immediately before or during the driving of platen 2 between its two rest and chocking positions and vice versa.

According to the preferred embodiment, motor assembly 5 is constituted by a cylinder of the double-effect hydraulic or double-effect pneumatic or electrical type, articulated via the end of its body to a crosspiece fixed to sole plate 12 and via the end of its rod to the aforesaid movement transmission. The cylinder will be associated with an appropriate control and power circuit known in itself. For reasons of safety and simplicity, this cylinder will be of the hydraulic type. Its hydraulic control and power circuit is provided in particular with a tank constituting an oil reserve, a hydraulic pump capable of drawing oil from the tank and delivering it to the hydraulic circuit, and at least one hydraulic distributor of the pilot-controlled type, associated with the front and rear chambers of the cylinder. This distributor has a movable slide valve, capable of occupying several positions. In a first position of its slide valve, the distributor is capable of supplying the front chamber of the cylinder with pressurized oil and of placing the rear chamber in communication with the tank. In a second position of the slide valve, the distributor is capable of supplying the rear chamber of the cylinder with pressurized oil and of placing the front chamber in communication with the tank, and in a third position of the slide valve, the distributor is capable of isolating the two front and rear chambers of the cylinder in such a way that they are not in communication with one another or with the tank, and that they cannot receive pressurized oil. In this third position of the slide valve, the hydraulic pump is in communication, via its orifice for delivering the pressurized oil flow, with the tank via the distributor or via any other appropriate hydraulic means. Such hydraulic circuits are known to those skilled in the art and will not be described in more detail here.

It is understood that, when the slide valve of the distributor is placed in its third position, platen 2 cannot be displaced on support 1 and is securely maintained in position thereon. Thus, when the platen is in anterior position and the slide valve of the distributor is in its third position, rear chock 3 is able to perform its function of stop and oppose continued backing movement of the vehicle as soon as one of the rear wheels of this vehicle comes into contact therewith while backing toward the dock. The vehicle is then blocked in a position at a distance from the dock.

To maintain the vehicle blocked at the dock, it will be possible to place the slide valve of the distributor in its third position or else to maintain the corresponding chamber of the cylinder under pressure.

In a practical embodiment, the movement transmission between motor assembly 5 and front chock or chocks 4 comprises a slide 55 guided in translation on platen 2, this slide 55 being integral with the end of the rod of the cylinder via a crosspiece and via a spindle. This slide receives, in fixed relationship, at least one rack 56, with which there is engaged a toothed pinion 57 or a toothed sector fixed rigidly to one of the cheeks of central crosspiece 41 in centered manner relative to pivoting axis AA'.

This slide 55 is urged in thrust manner by at least one elastic means 59, the thrust action tending to displace slide 55 toward a position corresponding to the active position of front chocks 4.

As mentioned in the foregoing, the extreme positions of each chock 4 are manifested by stops. These stops are capable of maintaining the transmission of force and movement between slide 55 and platen 2 without suffering deterioration. Thus, when chock 4 arrives at a stop, the movement of the rod of cylinder 5 can then be transmitted in its entirety to movable platen 2, which is then driven, together with rear and front chocks 3 and 4 in translation along support 1. It is therefore understood that the force imposed on slide 55 by motor assembly 5 is transmitted to platen 2 via the end of the corresponding stop, thus assuring displacement of this platen 2 along support 1.

Still in a preferred embodiment, the common constituent piece of the two arms 40 is constituted by an angle piece. Central crosspiece 41 is fixed on the lower curved face of one of the cheeks of this angle piece. In release position of each front chock 2, this cheek bears via its free rim against guide rails 11, which constitute one of the stops. In active position of each front chock 4, the lower curved face of the other cheek bears against cheeks 21, which constitute the other stop.

According to the preferred embodiment, slide 55 is guided on platen 2 substantially by lateral rails 58 fixed on guide 20 thereof.

The deployment or retraction of the rod of cylinder 5 generates the movement of slide 55, which may or may not be combined with the translation movement of drive platen 2 and consequently with the pivoting of each chock 4 around articulation axis AA' between its two positions, active and release. Consequently, each front chock 4 is guided either toward its active position or toward its release position by the fact in particular of the retraction or deployment of the rod of cylinder 5. More particularly, the movement of the rod of the cylinder with a view to deploying front chocks 4 initially drives the movement of slide 55 and concomitantly the movement of chocks 4, assisted in that by the thrust action of elastic means 59. Then, after complete deployment of front chocks 4, the movement of the rod of cylinder 5 generates the movement of platen 2 toward its chocking position. The inverse movement of the rod of cylinder 5 from the chocking position will initially generate the simultaneous movement of the slide, of front chocks 4 and of platen 2, and will do so as long as front chocks 4 are able to be braced on the wheels in question of the vehicle. Then, when chocks 4 have reached their release position, the movement of the rod of the cylinder will be transmitted in its entirety to platen 2 by way of the corresponding stop, and the said platen 2 will be returned to the anterior rest position.

In the preferred embodiment, cylinder 5 is extended behind slide 55 and acts thereon by traction, initially bringing front chocks 4 into active position and then bringing them against the wheels of the last wheel train or of the intermediate train of the vehicle and causing, by traction, the movement of backing of the vehicle toward the dock. However, it is quite evident that this arrangement is given merely by way of example and that it is possible for this cylinder 5 to be extended in front of slide 55, in which case it then acts by thrusting this slide to bring front chocks 4 into active position and to displace the vehicle toward the dock.

Alternatively, the movement transmission may comprise a pivot constituted by a shaft fixed to each of the cheeks of crosspiece 41 at a distance from axis AA'. By means of its end, the rod of the cylinder will be articulated to this pivot.

As mentioned in the foregoing, slide 55 is subjected to thrust by at least one elastic means 59. This elastic means is mounted between slide 55 and platen 2, and it imposes on slide 55 a thrust force, under the effect of which this slide tends to be displaced in a movement direction corresponding to the pivoting of front chocks 4 toward their active position. To this end, slide 55 is provided with two horizontal slideways 550, parallel to the direction of movement of platen 2, embedded via one of their rear terminal zones in a support block 551 mounted in fixed relationship on slide 55. Furthermore, these slideways 550 are each mounted slidingly in a guide bore formed to pass through a guide bearing 25 fixed to platen 2. An elastic means 59 in the form of a helical spring is mounted on each slideway 550, such that it is compressed between support block 551 and guide bearing 25.

At its front end, each slideway 550 will receive, in an appropriate groove, an elastic ring forming an annular stop. In this way slideways 550 are prevented from becoming extracted from their guide bearing under the effect of the action of springs 59.

According to the preferred embodiment, the movement transmission is provided with two racks 56 and central crosspiece 41 is equipped with two toothed pinions 57 cooperating respectively in engagement with the two racks 56.

It should be noted that the two cheeks of the constituent angle piece of arms 40, regardless of the angular position of front chocks 4, constitute two screens capable of protecting at least toothed pinion 57 from rain and dirt.

According to yet another embodiment, front chocks 4 are actuated between their release position and their active position and vice versa by a specific motor means.

Advantageously, it will be possible for each rear chock 3 to be equipped with a presence detector or a force transducer capable of signaling the presence of wheels of the last wheel train against rear chocks 3.

It will be possible for the chocking device according to the invention to be manipulated by an operator thereof, who to do so will then act on a control means known in itself integrated into the control and power circuit of motor assembly 5. With the assistance of this control means, the operator will be able to act on the chocking device to bring the vehicle up to the dock and, once transshipment has been completed, to make front chocks 4 release in order to liberate the vehicle.

The vehicle may be brought automatically against the dock, without the presence of an operator, In this hypothetical case, the control circuit of the motor assembly 5 will be equipped with a presence detector capable of detecting any obstacle and any person on the trajectory of the rear of the vehicle and of making motor assembly 5 stop in the case of detection.

Advantageously, it will be possible for the chocking device according to the invention to be equipped with at least one limit sensor for detecting the anterior rest position of the platen and/or with a limit sensor for detecting the posterior chocking position of the platen, and/or with a limit sensor for detecting the release position of front chocks 4 and/or with a limit sensor for detecting the active position of the said front chocks.

Finally, it will be possible for each front chock 4 to integrate at least one horizontal roll, perpendicular to the direction of displacement of platen 2 adapted to be braced against the wheel or wheels of the corresponding wheel train while the vehicle is being thrust toward the dock. This arrangement makes it possible to eliminate or greatly reduce any friction between front chock 4 and the wheel or wheels during the thrust movement of the vehicle.

Referring to FIGS. 5 to 9, the operation of the device according to the invention will now be explained.

Figure 5:
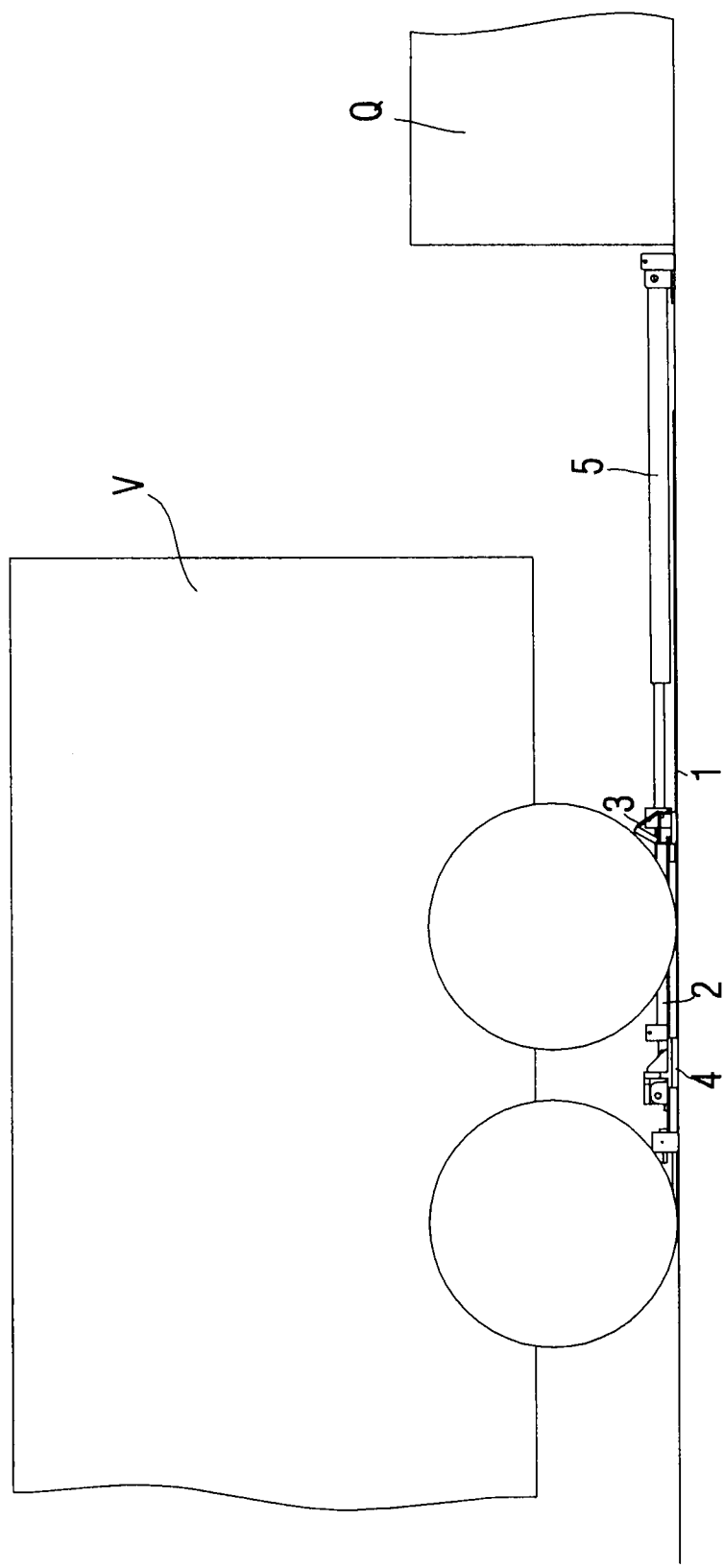

FIG. 5 shows a loading/unloading dock Q and dock parking area A for a vehicle extending in front of this dock, on which area there is installed a device according to the invention for chocking at the dock. In this figure it can be seen that platen 2 of the chocking device is in anterior rest position and that each front chock 4 is in release position braced on the ground. It is also apparent that each rear chock 3 forms a projection and is situated on the trajectory of the wheels of the last wheel train of a vehicle V in the phase of being secured against loading and unloading dock Q.

In this figure it is evident that, during the backing movement of vehicle V, the wheels of the last wheel train have arrived against rear chocks 3, which then prevent continued backing movement of the vehicle toward dock Q. It is noted in this figure that the distance separating the rear of vehicle V from loading/unloading dock Q is sufficient to prevent an accident of crushing of persons between the dock and this vehicle. It also is noted in this figure that each front chock 4 is situated directly in the interval between two successive rear wheel trains, in the present case between the first and last trains.

Figure 6:
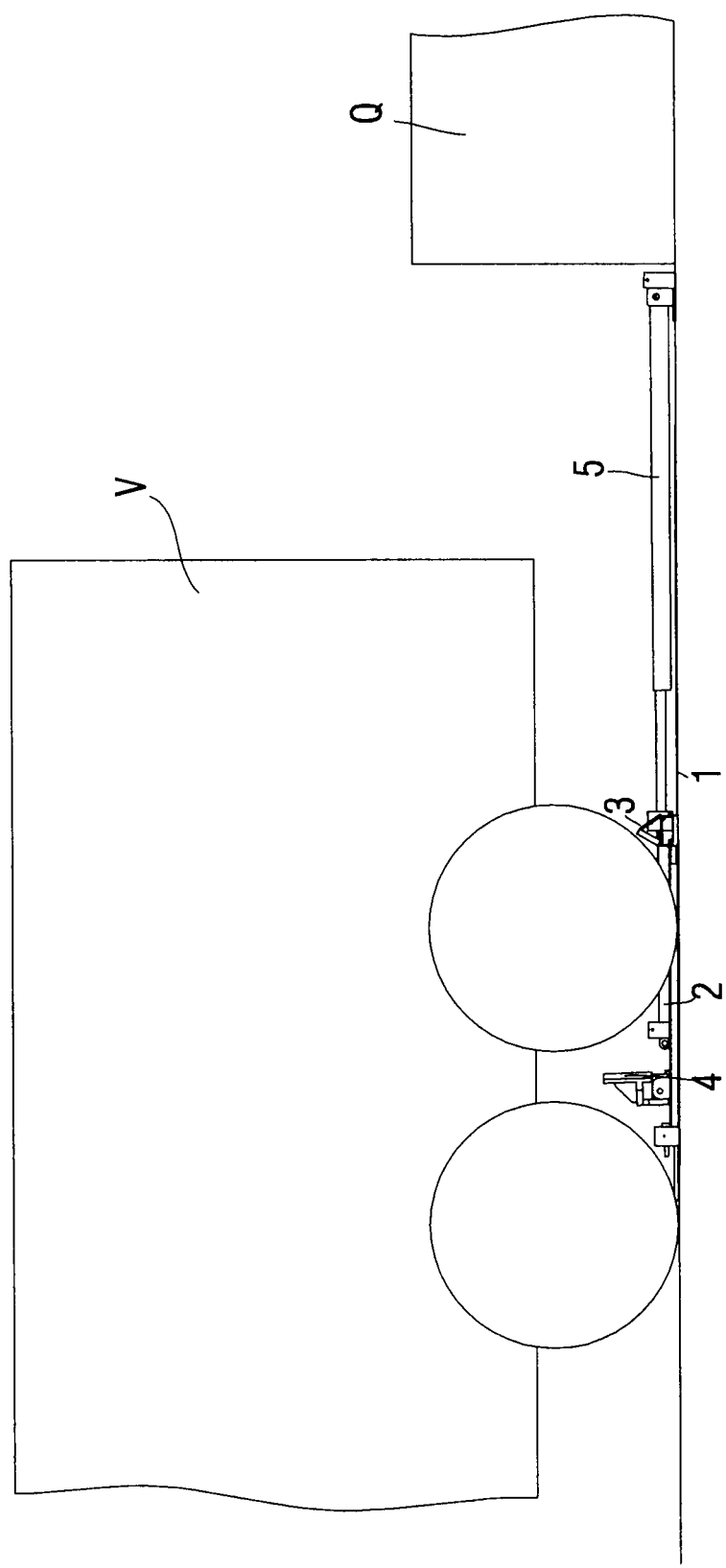

In FIG. 6 it can be seen that actuation of the rod of cylinder 5 in the direction of its retraction into the body thereof and the action exerted by elastic means 59 on slide 55 have caused slide 55 to be displaced in translation and consequently each front chock 4 to be driven toward its active position, by pivoting around axis AA', this pivoting movement resulting from the driving of toothed pinion 57 in rotation by rack 56. It is apparent in this figure that each front chock 4 is in stop position and is spaced apart from the wheel of the last wheel train. In this position, any traction force exerted by the rod of cylinder 5 on slide 55 will be transmitted in its entirety to platen 2 by way of racks 56, toothed pinions 57 and the corresponding stop.

Figure 7:
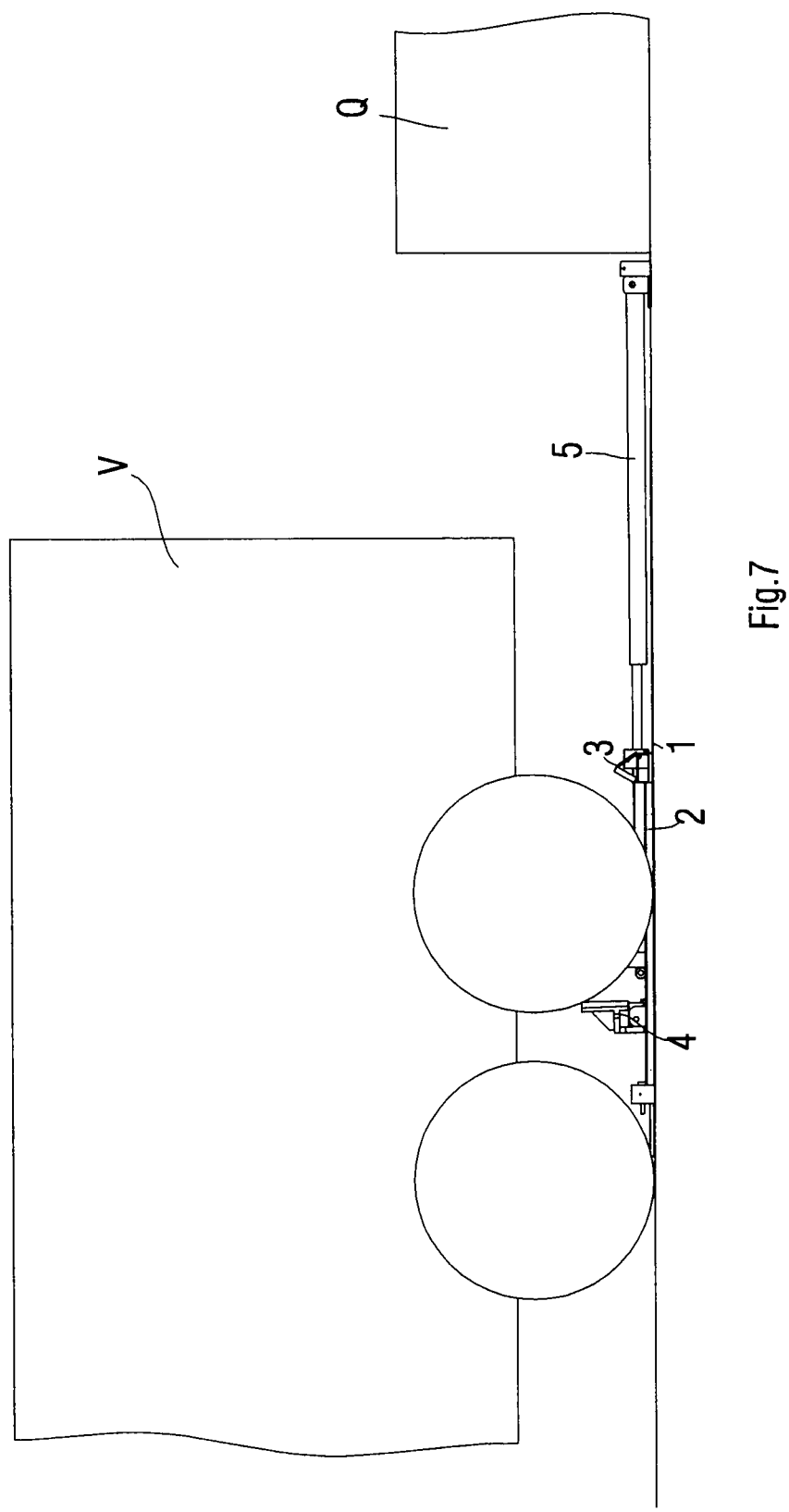

In FIG. 7 it can be seen that each front chock 4, by displacement of platen 2 under the effect of the retraction movement of the rod of cylinder 5, has been brought against the corresponding wheel of the last wheel train. It can be noted in this figure that rear chocks 3 are now spaced apart from the wheels of the last wheel train.

In FIG. 8 it can be noted that, by retraction of the rod of cylinder 5 into the body thereof and by displacement of platen 2 toward its chocking position, the thrust action of each front chock 4 on the corresponding wheel of the last wheel train has generated backing movement of vehicle V toward dock Q. It is noted in this figure that vehicle V is maintained against the dock by the chocking device.

In FIG. 9 it can be noted that, since the rod of cylinder 5 has been actuated in the deployment direction, slide 55 has been driven in translation on platen 2 so that rack 56 carried by slide 55 has driven toothed pinion 57 in rotation and consequently has driven each front chock 4 toward its release position. In this position, transportation vehicle V is freed from the grip of the chocking device and may leave dock Q.

The mode of operation of the device for chocking a vehicle equipped with two rear axles has just been described, but this same device with this same mode of operation may be used for chocking a vehicle equipped with three rear axles, front chocks 4 always acting on the wheels of the last wheel train. The device may be dimensioned so that it is able to exert thrust action on the wheels of the intermediate trains instead of on the wheels of the last wheel train. The mode of operation of this device will be in conformity with what has been described in the foregoing.

The present invention in its first embodiment may be provided with all configurations and variants from the field of technical equivalents. Thus it will be possible to dispose support 1, platen 2, motor assembly 5 and the movement transmission between motor assembly 5 and platen 2 in a box designed to be buried in the ground. In this hypothetical case, arms 30 and 40 will be raised relative to the platen so that they can maneuver on the ground.

A device whose motor assembly 5 and platen 2 occupy a central position on the dock parking area for a vehicle, the vehicle parked at the dock being positioned above the device has just been described, but as an alternative, in order to free this dock parking area of any obstacle, it will be possible for the device to be lateral thereto, as can be seen in FIGS. 10 to 16, which illustrate four other embodiments of the device according to the invention.

FIGS. 10 to 14 show the second, third and fourth embodiments of the device according to the invention. It is evident that, for these different embodiments, rear chock 3 is constituted by a horizontal arm extending laterally relative to platen 2 while being fixed thereto. Motor assembly 5 with which these second, third and fourth embodiments are equipped will be identical to that with which the first embodiment is equipped, except for the fact that the rod will be fixed not to a movement transmission but directly to platen 2. This motor assembly 5 will therefore be constituted by a double-effect hydraulic cylinder associated with a hydraulic control and power circuit such as described in the foregoing.

FIGS. 10 and 11 show the chocking device according to the second embodiment. It may be seen in these figures that the front or each front chock 4 is mounted in articulated manner on the platen around a horizontal axis parallel to the direction of displacement of the said platen 2, front chock 4 being vertical and preferably oriented downward when in release position, and being horizontal and spaced apart from the ground when in active position. In this embodiment, front chock 4 is constituted by a cylindrical arm, which at one of its two ends is fixed radially to a bush 43 having an axial through bore, via which it is engaged in rotation on a horizontal shaft 44 held at its two ends on bearings supported by platen 2 and fixed thereto. In addition, bush 43 has a crosspiece 45 supporting a spindle that receives, in articulated relationship, the end of the rod of a motor means 6 for actuating the front chock between its active position and its release position and vice versa. This actuating motor means 6 is preferably constituted by a hydraulic or pneumatic or electric cylinder, articulated via its body to platen 2. Advantageously, the constituent arm of chock 4 has cylindrical shape and receives a roll by shrink-fit. By virtue of the roll, any friction between the chock and the vehicle wheel is avoided while the vehicle is being brought up to the dock.

FIGS. 12 and 13 show the chocking device according to the third embodiment. It may be seen in these figures that the front or each front chock 4 is constituted by a horizontal arm extending perpendicular to the direction of displacement of platen 2. This arm is mounted slidingly in a tubular guide 46 fixed to platen 2. This chock is actuated between its release position and its active position by a motor means 6, preferably composed of a cylinder of hydraulic, pneumatic or electrical type. Preferably this cylinder is of the double-effect hydraulic type and will be associated with an appropriate hydraulic circuit equipped in particular with a hydraulic distributor having a slide valve capable of occupying three positions. The first of these positions corresponds to supplying pressurized oil to the rear chamber of the cylinder and to placing the front chamber in communication with the tank, the second position corresponds to supplying pressurized oil to the front chamber and to placing the rear chamber in communication with the tank, and finally the third position corresponds to isolating these two chambers, which are unable to receive oil or to be evacuated. The slide valve is placed in first position to mobilize chock 4 from its release position toward its active position and is placed in its second position to mobilize the chock from its active position toward its release position.

Cylinder 6 is fixed by its rod to the corresponding end of arm 4 and by its body to platen 2. In release position, front chock 4 is offset laterally relative to the trajectory of the rear wheels of the vehicle, while in active position, the front chock, by displacement of platen 2 toward its chocking position, will be able to act in thrust manner against one of the rolling surfaces of the corresponding wheel of the vehicle.

In these last two embodiments, it will be possible for front chock 4 and more particularly the constituent horizontal arm thereof to be equipped with a horizontal roll in such a way as to reduce the intensity of the forces of friction against the vehicle wheel during the thrust movement toward the dock.

In the diverse embodiments such as described, each front chock 4, when platen 2 is mobilized toward the chocking position, will act in thrust manner on the tread surface of the tire of the wheel or of each wheel of the corresponding train of the vehicle. Alternatively, according to the fourth embodiment, as represented in FIG. 14, front chock 4 of the device according to the third embodiment is equipped with an end roller 47 and, when platen 2 is mobilized toward the chocking position, acts in thrust manner by way of this roller 47, not against the tread surface of tire P but against the concave cylindrical surface of wheel rim J of the wheel. In this way, in deployed position, front chock 4, via roller 47, is positioned not behind the wheel but in wheel rim J thereof. Preferably, roller 47 acts on the cylindrical surface of the wheel rim in a lower region, for example situated substantially directly below the axis of the axle, in such a way that the wheel is securely maintained in braced manner against the ground by chock 4. This arrangement reduces the risk that, due to backing movement of the vehicle under the effect of the action of its own engine, the rear wheel thereof passes above rear chock 3 and crosses the stop constituted thereby. In this way it will be possible for the rear chock to be a short distance from the ground.

Preferably, in order to limit the penetration of roller 47 into wheel rim J, same will be equipped with a stop 48, in the form of a disk, intended to be braced against the lateral flank of the tire.

It should be noted that rear chock 3 is not shown in FIG. 14.

FIGS. 15 and 16 represent a fifth embodiment of the device according to the invention for chocking at the dock. According to this embodiment, platen 2 has the form, for example, of a carriage mounted slidingly on support 1. According to a practical embodiment, support 1 has the form of a tubular guide rail provided with a horizontal upper bracing and guide wall 100 having a median through slot 101 extending in the direction of the length of the profiled member. According to this practical embodiment, the carriage forming platen 2 is provided with two rollers 200 braced on upper wall 100 of the support. These rollers are spaced apart from one another and are each mounted to rotate around a horizontal axis perpendicular to the direction of displacement of platen 2, inside a crosspiece 201 carried by this platen. Furthermore, the constituent carriage of platen 2 has two vertical fingers 202, spaced apart, engaged through slot 101 and provided, at the lower end, in the constituent guide rail of support 1, with a collar 203 of diameter larger than the width of slot 101. This arrangement is suitable for ensuring that platen 2 does not detach from support 1 under the effect of an upwardly directed vertical action. In the presence of such an action, it is possible that platen 2 may rise up slightly, but collar 203 of each finger 201, by bearing against the internal face on the profiled member of horizontal upper wall 100, opposes any detachment. To reduce the amplitude of this potential vertical movement, the spacing between collar 203 of each finger 202 and wall 100 will be limited to the value of a functional clearance on the order of one millimeter.

According to a practical embodiment, rear chock 3 is constituted by a horizontal arm 300 carried by a pivoting lever 301 articulated by its upper end with platen 2, around a horizontal axis perpendicular to the direction of displacement of platen 2. More precisely, this pivoting lever 301 receives in fixed relationship, at its upper end, a horizontal shaft 302 engaged so as to be free to rotate in a rotary guide bore machined in a bush 303 fixed rigidly to platen 2. Horizontal arm 300 with which rear chock 3 is provided will be formed from a roll mounted to be free to rotate on a cylindrical hub fixed rigidly by one of its two ends to pivoting lever 301. By virtue of this arrangement, the action of one of the rear wheels of the vehicle on arm 300 during the backing movement of the vehicle will drive rear chock 3 in pivoting upward movement until it attains a final angular position opposing the displacement of the vehicle toward the rear.

Thus rear chock 3, in the absence of any urging, will occupy a rest position in which pivoting lever 301 is vertical and arm 302 is at a short distance from the ground, and a chocking position in which lever 301 is inclined relative to the vertical, toward the rear, and arm 300 is spaced apart from the ground.

By virtue of this arrangement, the risk of damage to the protective flap with which each rear wheel of the train is equipped is reduced. In fact, during the movement of the vehicle toward the rear, horizontal arm 300 of rear chock 3, while rising along the tire of the wheel, remains in contact therewith and can be inserted between the flap and the tire.

Advantageously, the final position of rear chock 3 is detected by a transducer, not shown, mounted on platen 2 and actuated either by lever 301 or by horizontal shaft 302 with which lever 301 is equipped. The angular value of the final position, measured from the vertical, depends on the diameter of the vehicle wheel, this diameter typically being between 800 mm and 1100 mm, as indicated in the foregoing. For this reason, the transducer will be able to detect these different final values. The information delivered by this transducer will be processed by the control circuit of motor assembly 5 to authorize activation thereof and consequently the movement of platen 2 from its anterior position toward its posterior position, its being understood that the movement takes place under the monitoring and control of a supervisor for this task.

Motor assembly 5 in this latter embodiment is constituted by two double-effect hydraulic cylinders 500, 501, disposed horizontally one above the other because of problems of space availability, and in a manner parallel to platen 2. These two cylinders 500, 501 have different body lengths and are integral with one another via a rigid connecting piece receiving the end of their rod in fixed relationship. One of these cylinders 500, the longer of the two, is articulated via its body on support 1. The other cylinder 501 is articulated via its body on platen 2. The front chamber of cylinder 500 is connected by a hydraulic conduit to the rear chamber of cylinder 501, while the front chamber of this cylinder 501 is connected by a hydraulic conduit to the rear chamber of cylinder 500. In addition, the rod of one of the cylinders, for example cylinder 501, in anterior rest position of platen 2, is totally deployed, while the rod of the other cylinder, still in anterior position of platen 2, is totally retracted into the body of the cylinder. These arrangements, despite reduced space availability, make it possible to increase the travel of platen 2, this travel being equal to the sum of the strokes of the rods of the cylinders.

The hydraulic control and power circuit with which this motor assembly is provided comprises substantially a tank constituting an oil reserve, a hydraulic pump capable of drawing oil from the tank and at least one hydraulic distributor of pilot-controlled type, associated with the front and rear chambers of these cylinders. This distributor has a movable slide valve that can occupy three positions. In a first position of the slide valve, the rear chamber of cylinder 500 and the front chamber of cylinder 501 are supplied, while the other chambers of these cylinders are placed in communication with the tank. In a second position of the slide valve, the front chamber of cylinder 500 and the rear chamber of cylinder 501 are supplied and the other two chambers are placed in communication with the tank. Finally, in a third position, the different chambers of these cylinders are isolated and are no longer able to receive or to deliver oil. The slide valve of the distributor is disposed in the first position in order to move platen 2 from the anterior position toward its chocking position. This slide valve is disposed in the second position in order to move platen 2 from the posterior position to its anterior position, and the slide valve is disposed in the third position in order to prevent any movement of platen 2 in one direction or the other.

The slide valve is disposed in its third position in order to maintain platen 2 in rest position, in order that rear stop 4 constitutes an obstacle to backing the vehicle toward the dock, and it ensures that the vehicle is maintained at a distance from the dock. The slide valve will also be disposed in its third position to maintain platen 2 in chocking position, in order to maintain the vehicle at the dock.

Advantageously, lower cylinder 500 is maintained parallel to platen 2 by a clamp 503 that embraces its body, this clamp being fixed rigidly to support 1.

Again according to this embodiment, front chock 4 is advantageously constituted by a chock according to the third or fourth embodiment of the device. Thus this front chock 4 is again constituted by a horizontal arm extending perpendicular to the direction of displacement of platen 2 and mounted slidingly in a tubular guide 46 fixed to platen 2. This chock 4 is again actuated between its release position and its active position by a motor means 6 constituted by a cylinder, for example of the double-effect hydraulic type, associated with an appropriate hydraulic circuit provided in particular with a three-position hydraulic distributor as described in the foregoing. This cylinder 6 is again fixed by its rod at the corresponding end of the constituent arm of the chock and by its body to platen 2.

Advantageously, the device in the last four embodiments described in the foregoing is provided at the front with a guide shape that favors introduction of the wheel trains on parking area A.

Dock parking area A may be equipped with a single device according to one of the second, third, fourth or fifth embodiments, but advantageously each parking area, as can be seen in FIGS. 10 and 11, is equipped with two devices according to the invention, respectively occupying left and right lateral positions relative to parking area A. These devices are designed to cooperate respectively with the right and left wheels of the corresponding axle of the vehicle.

Alternatively, as represented in FIGS. 12 and 13, it is possible to provide only a single device lateral relative to parking area A and one guide 7 spaced apart from the device and laterally bordering the other side of the parking area.

The invention claimed is:

1. A device for chocking a goods transportation vehicle at a dock, comprising:
   a horizontal support designed to be anchored on ground fronting a loading dock,
   a horizontal platen mounted slidingly on the horizontal support,
   a rear chock, designed to constitute a stop member for a last rear wheel train of the transportation vehicle to be chocked at the dock, the rear chock being connected with the platen, and
   a front chock, carried by the horizontal platen at a distance from the rear chock, the platen being slidable along the support between an anterior rest position and a posterior position of chocking the transportation vehicle at the dock by a motor assembly,
   wherein the motor assembly is capable of immobilizing the platen both in the anterior rest position and in the posterior position of chocking at the dock and maintaining the transportation vehicle in these positions,
   wherein the front chock includes a release position in which the front chock is spaced apart from a trajectory of a rear wheel of the last rear wheel train of the transportation vehicle,
   wherein the front chock includes an active position in which the front chock is disposed facing a surface of revolution of the rear wheel of the transportation vehicle and the front chock thrusts against the surface of revolution via displacement of the platen toward the posterior position of chocking, and
   wherein the rear chock includes a horizontal arm carried by a pivoting lever articulated by an upper end thereof with the platen, around a horizontal axis perpendicular to the direction of displacement of the platen.

2. The chocking device according to claim 1, wherein a distance between the rear chock and the front chock accommodates wheels of the last rear wheel train of the transportation vehicle and the distance is such that, when the last rear wheel train is braced against the rear chock, the front chock, in the anterior rest position, is disposed facing an unoccupied zone situated immediately in front of and spaced apart from a tread surface of a tire of the rear wheel of the last rear wheel train.

3. The chocking device according to claim 1, wherein a distance between the rear chock and the front chock accommodates wheels of the last rear wheel train of the transportation vehicle and the distance is such that, when the last rear wheel train is braced against the rear chock, the front chock, in the anterior rest position, is disposed behind a first wheel train and spaced apart from the last rear wheel train in such a way that the front chock can be freely actuated toward the active position and then, during a movement of the platen toward the posterior position of chocking, can thrust against the last rear wheel train of the transportation vehicle.

4. The chocking device according claim 1, wherein the front chock is disposed laterally relative to the platen, at least when the front chock is in the active position.

5. The chocking device according to claim 1, wherein the front chock is driven between the release position and the active position and vice versa by a motor means.

6. The chocking device according to claim 1,
   wherein the front chock includes a horizontal arm extending perpendicular to a direction of displacement of the platen, the horizontal arm being mounted slidingly in a tubular guide fixed to the platen, and
   wherein the front chock is actuated between the release position and the active position by a motor means including a cylinder fixed by a cylinder rod to a corresponding end of the horizontal arm and by cylinder body to the platen, the front chock being offset laterally relative to a trajectory of the rear wheel of the transportation vehicle when in the release position.

7. The device according to claim 1, wherein the motor assembly includes two double-effect hydraulic cylinders disposed horizontally one above the other in a manner parallel to the platen, the two cylinders having different body lengths and are connected to one another via a rigid connecting piece receiving an end of the two cylinders in fixed relationship,
   wherein a longer one of the two cylinders includes a body that is articulated on the support, and a shorter one of the two cylinders includes a body that is articulated on the platen,
   wherein a front chamber of the longer cylinder is connected by a hydraulic conduit to a rear chamber of the shorter cylinder, while a front chamber of the shorter cylinder is connected by a hydraulic conduit to a rear chamber of the longer cylinder, and wherein a rod of one of the two cylinders, in the anterior rest position of the platen, is totally deployed, while a rod of the other of the two cylinder, still in the anterior position of the platen, is totally retracted.

8. The device according to claim 1, wherein the front chock thrusts against a tread surface of a tire of the rear wheel.

9. An installation, comprising the chocking device according to claim 1 and a guide mounted to the ground spaced apart from the chocking device.

10. A device for chocking a goods transportation vehicle at a dock, comprising:
   a horizontal support designed to be anchored on ground fronting a loading dock,
   a horizontal platen mounted slidingly on the horizontal support,
   a rear chock, designed to constitute a stop member for a last rear wheel train of the transportation vehicle to be chocked at the dock, the rear chock being connected with the platen, and
   a front chock, carried by the horizontal platen at a distance from the rear chock, the platen being slidable along the support between an anterior rest position and a posterior position of chocking the transportation vehicle at the dock by a motor assembly,
   wherein the motor assembly is capable of immobilizing the platen both in the anterior rest position and in the posterior position of chocking at the dock and maintaining the transportation vehicle in these positions,
   wherein the front chock includes a release position in which the front chock is spaced apart from a trajectory of a rear wheel of the last rear wheel train of the transportation vehicle,
   wherein the front chock includes an active position in which the front chock is disposed facing a surface of revolution of the rear wheel of the transportation vehicle and the front chock thrusts against the surface of revolution via displacement of the platen toward the posterior position of chocking,
   wherein the front chock includes a horizontal arm extending perpendicular to a direction of displacement of the platen, the horizontal arm being mounted slidingly in a tubular guide fixed to the platen, and
   wherein the rear chock includes a horizontal arm carried by a pivoting lever articulated by an upper end thereof with the platen, around a horizontal axis perpendicular to the direction of displacement of the platen.

11. A device for chocking a goods transportation vehicle at a dock, comprising:
   a horizontal support designed to be anchored on ground fronting a loading dock,
   a horizontal platen mounted slidingly on the horizontal support,
   a rear chock, designed to constitute a stop member for a last rear wheel train of the transportation vehicle to be chocked at the dock, the rear chock being connected with the platen, and
   a front chock, carried by the horizontal platen at a distance from the rear chock, the platen being slidable along the support between an anterior rest position and a posterior position of chocking the transportation vehicle at the dock by a motor assembly,
   wherein the motor assembly is capable of immobilizing the platen both in the anterior rest position and in the posterior position of chocking at the dock and maintaining the transportation vehicle in these positions,
   wherein the front chock includes a release position in which the front chock is spaced apart from a trajectory of a rear wheel of the last rear wheel train of the transportation vehicle,
   wherein the front chock includes an active position in which the front chock is disposed facing a surface of revolution of the rear wheel of the transportation vehicle and the front chock thrusts against the surface of revolution via displacement of the platen toward the posterior position of chocking,
   wherein the front chock includes a horizontal arm extending perpendicular to a direction of displacement of the platen, the horizontal arm being mounted slidingly in a tubular guide fixed to the platen,
   wherein the rear chock includes a horizontal arm carried by a pivoting lever articulated by an upper end thereof with the platen, around a horizontal axis perpendicular to the direction of displacement of the platen,
   wherein the motor assembly includes two double-effect hydraulic cylinders disposed horizontally one above the other in a manner parallel to the platen, the two cylinders having different body lengths and are connected to one another via a rigid connecting piece receiving an end of the two cylinders in fixed relationship,
   wherein a longer one of the two cylinders includes a body that is articulated on the support, and a shorter one of the two cylinders includes a body that is articulated on the platen,
   wherein a front chamber of the longer cylinder is connected by a hydraulic conduit to a rear chamber of the shorter cylinder, while a front chamber of the shorter cylinder is connected by a hydraulic conduit to a rear chamber of the longer cylinder, and
   wherein a rod of one of the two cylinders, in the anterior rest position of the platen, is totally deployed, while a rod of the other of the two cylinder, still in the anterior position of the platen, is totally retracted.

* * * * *